(12) United States Patent
Girulat, Jr.

(10) Patent No.: US 9,690,820 B1
(45) Date of Patent: Jun. 27, 2017

(54) DATABASE SYSTEM FOR TRIGGERING EVENT NOTIFICATIONS BASED ON UPDATES TO DATABASE RECORDS

(71) Applicant: EXPERIAN INFORMATION SOLUTIONS, INC., Costa Mesa, CA (US)

(72) Inventor: Rollin M. Girulat, Jr., Lake Forest, CA (US)

(73) Assignee: EXPERIAN INFORMATION SOLUTIONS, INC., Costa Mesa, CA (US)

( * ) Notice: Subject to any disclaimer, the term of this patent is extended or adjusted under 35 U.S.C. 154(b) by 0 days.

(21) Appl. No.: 15/089,241

(22) Filed: Apr. 1, 2016

Related U.S. Application Data

(63) Continuation-in-part of application No. 12/239,647, filed on Sep. 26, 2008.
(Continued)

(51) Int. Cl.
    *G06Q 40/02*     (2012.01)
    *G06F 17/30*     (2006.01)
    *G06Q 10/06*     (2012.01)

(52) U.S. Cl.
CPC .. *G06F 17/30368* (2013.01); *G06F 17/30292* (2013.01); *G06F 17/30309* (2013.01);
(Continued)

(58) Field of Classification Search
CPC .............. G06Q 20/4016; G06Q 40/00; G06Q 30/0201; G06Q 40/02; G06Q 40/025;
(Continued)

(56) References Cited

U.S. PATENT DOCUMENTS

| 3,316,395 A | 4/1967 | Lavin et al. |
| 4,305,059 A | 12/1981 | Benton |

(Continued)

FOREIGN PATENT DOCUMENTS

| EP | 0 350 907 | 1/1990 |
| EP | 0 419 889 | 4/1991 |

(Continued)

OTHER PUBLICATIONS

U.S. Appl. No. 12/239,647, Systems and Methods for Monitoring Financial Activities of Consumers, filed Sep. 26, 2008.
(Continued)

*Primary Examiner* — Srirama Channavajjala
(74) *Attorney, Agent, or Firm* — Knobbe, Martens, Olson & Bear LLP

(57) ABSTRACT

A data processing system is disclosed for accessing databases and updated data items and triggering event notifications. The data processing system may comprise a first database including a plurality of records, and a second database including a plurality of trigger indicators. The database system may further include a hardware processor configured to execute computer-executable instructions in order to: receive an update data item; identify a record corresponding to the update data item; cause an update to the record based on information included with the update data item; identify a trigger indicator corresponding to the update to the record; determine that a type of the trigger indicator matches a type of the update to the record; and generate an event notification including information included in the update.

6 Claims, 6 Drawing Sheets

Related U.S. Application Data

(60) Provisional application No. 60/975,754, filed on Sep. 27, 2007, provisional application No. 62/316,399, filed on Mar. 31, 2016.

(52) U.S. Cl.
CPC ... *G06F 17/30377* (2013.01); *G06Q 10/0635* (2013.01); *G06Q 40/025* (2013.01); *G06F 17/30303* (2013.01)

(58) Field of Classification Search
CPC .............. G06Q 20/24; G06Q 10/0635; G06F 17/30289; G06F 17/30286; G06F 17/30386; G06F 17/30389; G06F 17/30424; G06F 17/30867; G06F 17/30303; G06F 17/30292; G06F 17/30309

See application file for complete search history.

(56) References Cited

U.S. PATENT DOCUMENTS

| | | | |
|---|---|---|---|
| 4,578,530 A | 3/1986 | Zeidler | |
| 4,736,294 A | 4/1988 | Gill | |
| 4,774,664 A | 9/1988 | Campbell et al. | |
| 4,775,935 A | 10/1988 | Yourick | |
| 4,827,508 A | 5/1989 | Shear | |
| 4,868,570 A | 9/1989 | Davis | |
| 4,872,113 A | 10/1989 | Dinerstein | |
| 4,876,592 A | 10/1989 | Von Kohorn | |
| 4,891,503 A | 1/1990 | Jewell | |
| 4,895,518 A | 1/1990 | Arnold et al. | |
| 4,935,870 A | 6/1990 | Burk, Jr. et al. | |
| 4,947,028 A | 8/1990 | Gorog | |
| 5,013,038 A | 5/1991 | Luxenberg et al. | |
| 5,025,138 A | 6/1991 | Cuervo | |
| 5,025,373 A | 6/1991 | Keyser, Jr. et al. | |
| 5,034,807 A | 7/1991 | Von Kohorn | |
| 5,056,019 A | 10/1991 | Schultz et al. | |
| 5,060,153 A | 10/1991 | Nakagawa | |
| 5,148,365 A | 9/1992 | Dembo | |
| 5,220,501 A | 6/1993 | Lawlor et al. | |
| 5,239,462 A | 8/1993 | Jones et al. | |
| 5,247,575 A | 9/1993 | Sprague et al. | |
| 5,259,766 A | 11/1993 | Sack | |
| 5,262,941 A | 11/1993 | Saladin | |
| 5,274,547 A | 12/1993 | Zoffel et al. | |
| 5,317,636 A * | 5/1994 | Vizcaino | G06Q 20/341 705/65 |
| 5,325,509 A | 6/1994 | Lautzenheiser | |
| 5,336,870 A | 8/1994 | Hughes et al. | |
| 5,341,429 A | 8/1994 | Stringer et al. | |
| 5,361,201 A | 11/1994 | Jost et al. | |
| 5,521,813 A | 5/1996 | Fox et al. | |
| 5,528,701 A | 6/1996 | Aref | |
| 5,555,409 A | 9/1996 | Leenstra, Sr. et al. | |
| 5,583,763 A | 12/1996 | Atcheson et al. | |
| 5,590,038 A | 12/1996 | Pitroda | |
| 5,592,560 A | 1/1997 | Deaton et al. | |
| 5,611,052 A | 3/1997 | Dykstra et al. | |
| 5,615,408 A * | 3/1997 | Johnson | H04L 63/1416 455/405 |
| 5,630,127 A | 5/1997 | Moore et al. | |
| 5,640,551 A | 6/1997 | Chu et al. | |
| 5,640,577 A | 6/1997 | Scharmer | |
| 5,649,114 A | 7/1997 | Deaton et al. | |
| 5,655,129 A | 8/1997 | Ito | |
| 5,659,725 A | 8/1997 | Levy et al. | |
| 5,659,731 A | 8/1997 | Gustafson | |
| 5,666,528 A | 9/1997 | Thai | |
| 5,692,107 A | 11/1997 | Simoudis et al. | |
| 5,696,907 A | 12/1997 | Tom | |
| 5,699,527 A | 12/1997 | Davidson | |
| 5,704,029 A | 12/1997 | Wright, Jr. | |
| 5,708,422 A * | 1/1998 | Blonder | G06Q 20/40 340/5.41 |
| 5,732,400 A | 3/1998 | Mandler | |
| 5,737,732 A | 4/1998 | Gibson et al. | |
| 5,754,938 A | 5/1998 | Herz et al. | |
| 5,768,423 A | 6/1998 | Aref et al. | |
| 5,774,692 A | 6/1998 | Boyer et al. | |
| 5,774,883 A | 6/1998 | Andersen | |
| 5,778,405 A | 7/1998 | Ogawa | |
| 5,793,972 A | 8/1998 | Shane | |
| 5,797,136 A | 8/1998 | Boyer et al. | |
| 5,802,142 A | 9/1998 | Browne | |
| 5,812,840 A | 9/1998 | Shwartz | |
| 5,819,226 A | 10/1998 | Gopinathan et al. | |
| 5,822,410 A | 10/1998 | McCausland et al. | |
| 5,822,750 A | 10/1998 | Jou et al. | |
| 5,822,751 A | 10/1998 | Gray et al. | |
| 5,835,915 A | 11/1998 | Carr et al. | |
| 5,844,218 A | 12/1998 | Kawan et al. | |
| 5,857,174 A | 1/1999 | Dugan | |
| 5,870,721 A | 2/1999 | Norris | |
| 5,875,236 A | 2/1999 | Jankowitz | |
| 5,878,403 A * | 3/1999 | DeFrancesco | G06Q 20/10 705/35 |
| 5,881,131 A | 3/1999 | Farris et al. | |
| 5,884,287 A | 3/1999 | Edesess | |
| 5,905,985 A | 5/1999 | Malloy et al. | |
| 5,914,472 A | 6/1999 | Foladare et al. | |
| 5,918,217 A | 6/1999 | Maggioncalda et al. | |
| 5,924,082 A | 7/1999 | Silverman et al. | |
| 5,926,800 A | 7/1999 | Baronowski et al. | |
| 5,930,764 A | 7/1999 | Melchione et al. | |
| 5,930,776 A | 7/1999 | Dykstra et al. | |
| 5,933,813 A | 8/1999 | Teicher et al. | |
| 5,940,812 A | 8/1999 | Tengel et al. | |
| 5,950,172 A | 9/1999 | Klingman | |
| 5,950,179 A | 9/1999 | Buchanan et al. | |
| 5,953,707 A | 9/1999 | Huang et al. | |
| 5,956,693 A | 9/1999 | Geerlings | |
| 5,963,932 A | 10/1999 | Jakobsson et al. | |
| 5,966,695 A | 10/1999 | Melchione et al. | |
| 5,970,478 A | 10/1999 | Walker et al. | |
| 5,974,396 A | 10/1999 | Anderson et al. | |
| 5,978,780 A | 11/1999 | Watson | |
| 5,991,411 A * | 11/1999 | Kaufman | G06Q 20/085 235/379 |
| 5,995,947 A | 11/1999 | Fraser et al. | |
| 6,009,415 A | 12/1999 | Shurling et al. | |
| 6,012,044 A | 1/2000 | Maggioncalda et al. | |
| 6,014,645 A | 1/2000 | Cunningham | |
| 6,018,723 A | 1/2000 | Siegel et al. | |
| 6,021,397 A | 2/2000 | Jones et al. | |
| 6,029,149 A | 2/2000 | Dykstra et al. | |
| 6,038,551 A | 3/2000 | Barlow et al. | |
| 6,044,357 A | 3/2000 | Garg | |
| 6,055,570 A | 4/2000 | Nielsen | |
| 6,064,987 A | 5/2000 | Walker | |
| 6,064,990 A | 5/2000 | Goldsmith | |
| 6,070,141 A | 5/2000 | Houvener | |
| 6,070,147 A | 5/2000 | Harms et al. | |
| 6,073,140 A | 6/2000 | Morgan et al. | |
| 6,088,686 A | 7/2000 | Walker et al. | |
| 6,094,643 A | 7/2000 | Anderson et al. | |
| 6,098,052 A | 8/2000 | Kosiba et al. | |
| 6,105,007 A | 8/2000 | Norris | |
| 6,115,690 A | 9/2000 | Wong | |
| 6,115,694 A | 9/2000 | Cheetham et al. | |
| 6,119,103 A | 9/2000 | Basch et al. | |
| 6,121,901 A | 9/2000 | Welch et al. | |
| 6,128,599 A | 10/2000 | Walker | |
| 6,128,603 A | 10/2000 | Dent | |
| 6,128,624 A | 10/2000 | Papierniak et al. | |
| 6,144,948 A | 11/2000 | Walker et al. | |
| 6,144,957 A | 11/2000 | Cohen et al. | |
| 6,151,601 A | 11/2000 | Papierniak et al. | |
| 6,154,729 A | 11/2000 | Cannon et al. | |
| 6,182,060 B1 | 1/2001 | Hedgcock et al. | |
| 6,182,229 B1 | 1/2001 | Nielsen | |
| 6,185,543 B1 | 2/2001 | Galperin et al. | |

(56) References Cited

U.S. PATENT DOCUMENTS

| | | | |
|---|---|---|---|
| 6,202,053 B1 | 3/2001 | Christiansen et al. | |
| 6,223,171 B1 | 4/2001 | Chaudhuri et al. | |
| 6,249,770 B1 | 6/2001 | Erwin et al. | |
| 6,253,203 B1 | 6/2001 | O'Flaherty et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,269,325 B1 | 7/2001 | Lee et al. | |
| 6,275,824 B1 | 8/2001 | O'Flaherty et al. | |
| 6,298,348 B1 | 10/2001 | Eldering | |
| 6,304,860 B1 | 10/2001 | Martin et al. | |
| 6,304,869 B1 | 10/2001 | Moore et al. | |
| 6,311,169 B2 * | 10/2001 | Duhon | G06Q 20/04 705/38 |
| 6,321,205 B1 | 11/2001 | Eder | |
| 6,324,524 B1 | 11/2001 | Lent et al. | |
| 6,330,546 B1 * | 12/2001 | Gopinathan | G06Q 20/00 705/35 |
| 6,330,575 B1 | 12/2001 | Moore | |
| 6,334,110 B1 | 12/2001 | Walter et al. | |
| 6,339,769 B1 | 1/2002 | Cochrane et al. | |
| 6,343,279 B1 | 1/2002 | Bissonette et al. | |
| 6,366,903 B1 | 4/2002 | Agrawal et al. | |
| 6,374,230 B1 | 4/2002 | Walker et al. | |
| 6,384,844 B1 | 5/2002 | Stewart et al. | |
| 6,385,594 B1 | 5/2002 | Lebda et al. | |
| 6,386,444 B1 | 5/2002 | Sullivan | |
| 6,393,406 B1 | 5/2002 | Eder | |
| 6,397,224 B1 | 5/2002 | Zubeldia et al. | |
| 6,405,173 B1 | 6/2002 | Honarvar | |
| 6,405,181 B2 | 6/2002 | Lent et al. | |
| 6,430,539 B1 | 8/2002 | Lazarus et al. | |
| 6,456,979 B1 | 9/2002 | Flagg | |
| 6,460,036 B1 | 10/2002 | Herz | |
| 6,496,819 B1 | 12/2002 | Bello et al. | |
| 5,870,721 C1 | 1/2003 | Norris | |
| 6,513,018 B1 | 1/2003 | Culhane | |
| 6,523,022 B1 | 2/2003 | Hobbs | |
| 6,523,041 B1 | 2/2003 | Morgan et al. | |
| 6,532,450 B1 | 3/2003 | Brown et al. | |
| 6,542,894 B1 | 4/2003 | Lee et al. | |
| 6,567,791 B2 | 5/2003 | Lent et al. | |
| 6,574,623 B1 | 6/2003 | Laung et al. | |
| 6,597,775 B2 | 7/2003 | Lawyer et al. | |
| 6,598,030 B1 | 7/2003 | Siegel et al. | |
| 6,611,816 B2 | 8/2003 | Lebda et al. | |
| 6,622,131 B1 | 9/2003 | Brown et al. | |
| 6,622,266 B1 | 9/2003 | Goddard et al. | |
| 6,629,245 B1 | 9/2003 | Stone et al. | |
| 6,631,496 B1 | 10/2003 | Li et al. | |
| 6,651,220 B1 | 11/2003 | Penteroudakis et al. | |
| 6,658,393 B1 | 12/2003 | Basch et al. | |
| 6,703,930 B2 | 3/2004 | Skinner | |
| 6,745,938 B2 | 6/2004 | Sullivan | |
| 6,766,327 B2 | 7/2004 | Morgan, Jr. et al. | |
| 6,782,390 B2 | 8/2004 | Lee et al. | |
| 6,804,346 B1 | 10/2004 | Mewhinney | |
| 6,804,701 B2 | 10/2004 | Muret et al. | |
| 6,805,287 B2 | 10/2004 | Bishop et al. | |
| 6,823,319 B1 | 11/2004 | Lynch et al. | |
| 6,839,682 B1 | 1/2005 | Blume et al. | |
| 6,839,690 B1 | 1/2005 | Foth et al. | |
| 6,847,942 B1 | 1/2005 | Land et al. | |
| 6,850,606 B2 | 2/2005 | Lawyer et al. | |
| 6,873,972 B1 | 3/2005 | Marcial et al. | |
| 6,873,979 B2 | 3/2005 | Fishman et al. | |
| 6,901,406 B2 | 5/2005 | Nabe et al. | |
| 6,910,624 B1 | 6/2005 | Natsuno | |
| 6,950,807 B2 | 9/2005 | Brock | |
| 6,962,336 B2 | 11/2005 | Glass | |
| 6,983,478 B1 | 1/2006 | Grauch et al. | |
| 6,985,887 B1 | 1/2006 | Sunstein et al. | |
| 6,988,085 B2 | 1/2006 | Hedy | |
| 7,003,504 B1 | 2/2006 | Angus et al. | |
| 7,003,792 B1 | 2/2006 | Yuen | |
| 7,016,870 B1 | 3/2006 | Jones et al. | |
| 7,028,052 B2 | 4/2006 | Chapman et al. | |
| 7,039,607 B2 | 5/2006 | Watarai et al. | |
| 7,047,251 B2 | 5/2006 | Reed et al. | |
| 7,058,817 B1 | 6/2006 | Ellmore | |
| 7,062,458 B2 | 6/2006 | Maggioncalda et al. | |
| 7,069,249 B2 | 6/2006 | Stolfo et al. | |
| 7,076,462 B1 | 7/2006 | Nelson et al. | |
| 7,076,475 B2 | 7/2006 | Honarvar | |
| 7,082,435 B1 | 7/2006 | Guzman et al. | |
| 7,083,087 B1 * | 8/2006 | Gangi | G06Q 20/341 235/379 |
| 7,120,599 B2 | 10/2006 | Keyes | |
| 7,136,448 B1 | 11/2006 | Venkataperumal et al. | |
| 7,143,063 B2 | 11/2006 | Lent | |
| 7,184,974 B2 | 2/2007 | Shishido | |
| 7,185,016 B1 | 2/2007 | Rasmussen | |
| 7,200,602 B2 | 4/2007 | Jonas | |
| 7,240,059 B2 | 7/2007 | Bayliss et al. | |
| 7,249,048 B1 | 7/2007 | O'Flaherty | |
| 7,249,076 B1 | 7/2007 | Pendleton et al. | |
| 7,249,113 B1 | 7/2007 | Continelli et al. | |
| 7,254,558 B2 | 8/2007 | Hinkle et al. | |
| 7,263,497 B1 | 8/2007 | Wiser et al. | |
| 7,277,869 B2 | 10/2007 | Starkman | |
| 7,277,900 B1 | 10/2007 | Ganesh et al. | |
| 7,280,980 B1 | 10/2007 | Hoadley et al. | |
| 7,280,983 B2 | 10/2007 | Kuroda et al. | |
| 7,296,734 B2 | 11/2007 | Pliha | |
| 7,302,420 B2 | 11/2007 | Aggarwal et al. | |
| 7,314,166 B2 | 1/2008 | Anderson et al. | |
| 7,318,224 B2 | 1/2008 | Honarvar et al. | |
| 7,333,635 B2 | 2/2008 | Tsantes et al. | |
| 7,333,937 B2 | 2/2008 | Baldwin, Jr. et al. | |
| 7,337,133 B1 | 2/2008 | Bezos et al. | |
| 7,337,468 B2 | 2/2008 | Metzger | |
| 7,340,434 B2 | 3/2008 | Schnall | |
| 7,343,295 B2 | 3/2008 | Pomerance | |
| 7,366,694 B2 | 4/2008 | Lazerson | |
| 7,367,011 B2 | 4/2008 | Ramsey et al. | |
| 7,370,044 B2 | 5/2008 | Mulhern et al. | |
| 7,376,603 B1 | 5/2008 | Mayr et al. | |
| 7,383,215 B1 | 6/2008 | Navarro et al. | |
| 7,383,227 B2 | 6/2008 | Weinflash et al. | |
| 7,383,988 B2 | 6/2008 | Slonecker, Jr. | |
| 7,386,466 B2 | 6/2008 | McLean et al. | |
| 7,392,221 B2 | 6/2008 | Nabe et al. | |
| 7,395,232 B1 | 7/2008 | Pilato | |
| 7,403,919 B2 | 7/2008 | Chacko et al. | |
| 7,403,942 B1 | 7/2008 | Bayliss | |
| 7,409,369 B1 | 8/2008 | Homuth et al. | |
| 7,418,417 B2 | 8/2008 | Chacko et al. | |
| 7,428,509 B2 | 9/2008 | Klebanoff | |
| 7,433,855 B2 | 10/2008 | Gavan et al. | |
| 7,451,095 B1 | 11/2008 | Bradley et al. | |
| 7,458,508 B1 | 12/2008 | Shao et al. | |
| 7,467,127 B1 | 12/2008 | Baccash et al. | |
| 7,479,949 B2 | 1/2009 | Jobs et al. | |
| 7,505,939 B2 | 3/2009 | Lent et al. | |
| 7,529,698 B2 | 5/2009 | Joao | |
| 7,536,346 B2 | 5/2009 | Aliffi et al. | |
| 7,542,993 B2 | 6/2009 | Satterfield et al. | |
| 7,543,739 B2 | 6/2009 | Brown et al. | |
| 7,546,266 B2 | 6/2009 | Beirne et al. | |
| 7,552,086 B1 * | 6/2009 | Rajasekar | G06Q 40/02 705/38 |
| 7,556,192 B2 | 7/2009 | Wokaty, Jr. | |
| 7,559,217 B2 | 7/2009 | Bass | |
| 7,562,184 B2 | 7/2009 | Henmi et al. | |
| 7,584,146 B1 | 9/2009 | Duhon | |
| 7,593,891 B2 | 9/2009 | Kornegay et al. | |
| 7,596,512 B1 | 9/2009 | Raines et al. | |
| 7,596,716 B2 | 9/2009 | Frost et al. | |
| 7,603,317 B2 | 10/2009 | Adler et al. | |
| 7,610,229 B1 | 10/2009 | Kornegay | |
| 7,620,592 B2 | 11/2009 | O'Mara et al. | |
| 7,624,068 B1 | 11/2009 | Heasley et al. | |
| 7,630,932 B2 | 12/2009 | Danaher et al. | |
| 7,653,592 B1 | 1/2010 | Flaxman et al. | |

(56) References Cited

U.S. PATENT DOCUMENTS

| | | |
|---|---|---|
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,418 B1 | 3/2010 | Chung et al. |
| 7,686,214 B1 | 3/2010 | Shao et al. |
| 7,689,451 B2 | 3/2010 | Vives |
| 7,689,505 B2 | 3/2010 | Kasower |
| 7,698,163 B2 | 4/2010 | Reed et al. |
| 7,707,059 B2 | 4/2010 | Reed et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,725,385 B2 | 5/2010 | Royer et al. |
| 7,729,983 B1 | 6/2010 | Ellis |
| 7,734,522 B2 | 6/2010 | Johnson et al. |
| 7,734,523 B1 | 6/2010 | Cui et al. |
| 7,742,982 B2 | 6/2010 | Chaudhuri et al. |
| 7,747,480 B1 | 6/2010 | Agresta et al. |
| 7,756,789 B2 | 7/2010 | Welker et al. |
| 7,761,379 B2 | 7/2010 | Zoldi et al. |
| 7,769,657 B2 | 8/2010 | Chacko et al. |
| 7,774,257 B2 | 8/2010 | Maggioncalda et al. |
| 7,774,270 B1 | 8/2010 | MacCloskey |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,732 B2 | 9/2010 | Haggerty et al. |
| 7,793,835 B1 | 9/2010 | Coggeshall et al. |
| 7,801,812 B2 | 9/2010 | Conlin et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,836,111 B1 | 11/2010 | Shan |
| 7,840,484 B2 | 11/2010 | Haggerty et al. |
| 7,848,987 B2 | 12/2010 | Haig |
| 7,849,004 B2 | 12/2010 | Choudhuri et al. |
| 7,853,998 B2 | 12/2010 | Blaisdell et al. |
| 7,856,397 B2 | 12/2010 | Whipple et al. |
| 7,860,782 B2 | 12/2010 | Cash et al. |
| 7,877,304 B1 | 1/2011 | Coulter |
| 7,890,420 B2 | 2/2011 | Haggerty et al. |
| 7,900,052 B2 | 3/2011 | Jonas |
| 7,904,306 B2 | 3/2011 | Johnson et al. |
| 7,904,367 B2 | 3/2011 | Chung et al. |
| 7,912,770 B2 | 3/2011 | Haggerty et al. |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,252 B2 | 4/2011 | Bender et al. |
| 7,941,365 B1 | 5/2011 | Bradley et al. |
| 7,945,510 B1 | 5/2011 | Bradley et al. |
| 7,954,698 B1 | 6/2011 | Pliha |
| 7,966,192 B2 | 6/2011 | Pagliari et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,983,975 B2 | 7/2011 | Jones et al. |
| 7,987,124 B1 | 7/2011 | Holden et al. |
| 7,991,666 B2 | 8/2011 | Haggerty et al. |
| 7,991,689 B1 | 8/2011 | Brunzell et al. |
| 8,001,034 B2 | 8/2011 | Chung et al. |
| 8,001,041 B2 | 8/2011 | Hoadley et al. |
| 8,001,042 B1 | 8/2011 | Brunzell et al. |
| 8,001,043 B1 | 8/2011 | Walker et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,024,263 B2 | 9/2011 | Zarikian et al. |
| 8,024,264 B2 | 9/2011 | Chaudhuri et al. |
| 8,032,932 B2 | 10/2011 | Speyer et al. |
| 8,036,979 B1 | 10/2011 | Torrez et al. |
| 8,055,579 B2 | 11/2011 | Davies et al. |
| 8,060,424 B2 | 11/2011 | Kasower |
| 8,065,233 B2 | 11/2011 | Lee et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,086,523 B1 | 12/2011 | Palmer |
| 8,086,524 B1 | 12/2011 | Craig et al. |
| 8,095,443 B2 | 1/2012 | DeBie |
| 8,095,458 B2 | 1/2012 | Peterson et al. |
| 8,099,356 B2 | 1/2012 | Feinstein et al. |
| 8,104,679 B2 | 1/2012 | Brown |
| 8,126,805 B2 | 2/2012 | Sulkowski et al. |
| 8,131,614 B2 | 3/2012 | Haggerty et al. |
| 8,135,642 B1 | 3/2012 | Krause |
| 8,160,960 B1 | 4/2012 | Fei et al. |
| 8,165,940 B2 | 4/2012 | Meimes et al. |
| 8,195,549 B2 | 6/2012 | Kasower |
| 8,204,774 B2 | 6/2012 | Chwast et al. |
| 8,204,812 B2 | 6/2012 | Stewart et al. |
| 8,225,395 B2 | 7/2012 | Atwood et al. |
| 8,234,498 B2 | 7/2012 | Britti et al. |
| 8,271,378 B2 | 9/2012 | Chaudhuri et al. |
| 8,285,613 B1 | 10/2012 | Coulter |
| 8,290,840 B2 | 10/2012 | Kasower |
| 8,296,229 B1 | 10/2012 | Yellin et al. |
| 8,301,574 B2 | 10/2012 | Kilger et al. |
| 8,311,936 B2 | 11/2012 | Haggerty et al. |
| 8,315,942 B2 | 11/2012 | Haggerty et al. |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,364,518 B1 | 1/2013 | Blake et al. |
| 8,364,588 B2 | 1/2013 | Celka et al. |
| 8,392,334 B2 | 3/2013 | Hirtenstein et al. |
| 8,464,939 B1 | 6/2013 | Taylor et al. |
| 8,489,502 B2 | 7/2013 | Morris et al. |
| 8,515,844 B2 | 8/2013 | Kasower |
| 8,533,118 B2 | 9/2013 | Weller et al. |
| 8,560,161 B1 | 10/2013 | Kator et al. |
| 8,560,436 B2 | 10/2013 | Ingram et al. |
| 8,571,971 B1 | 10/2013 | Brown et al. |
| 8,572,083 B1 | 10/2013 | Snell et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,626,646 B2 | 1/2014 | Torrez et al. |
| 8,660,919 B2 | 2/2014 | Kasower |
| 8,694,420 B1 | 4/2014 | Oliai |
| 8,732,004 B1 | 5/2014 | Ramos et al. |
| 8,738,515 B2 | 5/2014 | Chaudhuri et al. |
| 8,738,516 B1 | 5/2014 | Dean et al. |
| 8,762,243 B2 | 6/2014 | Jenkins et al. |
| 8,775,299 B2 * | 7/2014 | Achanta .......... G06Q 40/00 705/35 |
| 8,781,951 B2 | 7/2014 | Lewis et al. |
| 8,781,953 B2 | 7/2014 | Kasower |
| 8,856,894 B1 | 10/2014 | Dean et al. |
| 8,930,251 B2 | 1/2015 | DeBie |
| 8,930,263 B1 | 1/2015 | Mahacek et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,251,541 B2 | 2/2016 | Celka et al. |
| 9,558,519 B1 | 1/2017 | Burger |
| 9,569,797 B1 | 2/2017 | Rohn et al. |
| 2001/0011247 A1 | 8/2001 | O'Flaherty et al. |
| 2001/0027413 A1 | 10/2001 | Bhutta |
| 2001/0037332 A1 | 11/2001 | Miller et al. |
| 2001/0039523 A1 | 11/2001 | Iwamoto |
| 2001/0042785 A1 | 11/2001 | Walker et al. |

(56) References Cited

U.S. PATENT DOCUMENTS

| | | |
|---|---|---|
| 2001/0044729 A1 | 11/2001 | Pomerance |
| 2001/0049620 A1 | 12/2001 | Blasko |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0049624 A1 | 4/2002 | Raveis, Jr. |
| 2002/0052836 A1 | 5/2002 | Galperin et al. |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0099628 A1 | 7/2002 | Takaoka et al. |
| 2002/0099641 A1 | 7/2002 | Mills et al. |
| 2002/0099824 A1 | 7/2002 | Bender et al. |
| 2002/0107765 A1 | 8/2002 | Walker |
| 2002/0111890 A1 | 8/2002 | Sloan et al. |
| 2002/0128962 A1 | 9/2002 | Kasower |
| 2002/0138297 A1 | 9/2002 | Lee |
| 2002/0138333 A1 | 9/2002 | DeCotiis et al. |
| 2002/0138334 A1 | 9/2002 | DeCotiis et al. |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0194103 A1 | 12/2002 | Nabe |
| 2002/0194117 A1 | 12/2002 | Nabe et al. |
| 2002/0198806 A1 | 12/2002 | Blagg et al. |
| 2002/0198824 A1 | 12/2002 | Cook |
| 2003/0009415 A1 | 1/2003 | Lutnick et al. |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0041031 A1 | 2/2003 | Hedy |
| 2003/0046222 A1 | 3/2003 | Bard et al. |
| 2003/0065563 A1 | 4/2003 | Elliott et al. |
| 2003/0078897 A1 | 4/2003 | Florance et al. |
| 2003/0097380 A1 | 5/2003 | Mulhern et al. |
| 2003/0105728 A1 | 6/2003 | Yano et al. |
| 2003/0115122 A1 | 6/2003 | Slater et al. |
| 2003/0149659 A1 | 8/2003 | Danaher et al. |
| 2003/0154162 A1 | 8/2003 | Danaher et al. |
| 2003/0163435 A1 | 8/2003 | Payone |
| 2003/0171942 A1 | 9/2003 | Gaito |
| 2003/0172039 A1* | 9/2003 | Guy .................. G06Q 20/04 705/68 |
| 2003/0187780 A1 | 10/2003 | Arthus et al. |
| 2003/0195830 A1 | 10/2003 | Merkoulovitch et al. |
| 2003/0204752 A1 | 10/2003 | Garrison |
| 2003/0212618 A1 | 11/2003 | Keyes et al. |
| 2003/0212654 A1 | 11/2003 | Harper et al. |
| 2003/0229580 A1 | 12/2003 | Gass et al. |
| 2003/0236738 A1 | 12/2003 | Lange et al. |
| 2004/0006536 A1 | 1/2004 | Kawashima et al. |
| 2004/0023637 A1 | 2/2004 | Johnson et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1* | 6/2004 | Hudock .............. G06Q 40/025 705/38 |
| 2004/0111363 A1 | 6/2004 | Trench et al. |
| 2004/0117302 A1 | 6/2004 | Weichert et al. |
| 2004/0122735 A1 | 6/2004 | Meshkin |
| 2004/0128150 A1 | 7/2004 | Lundegren |
| 2004/0128230 A1 | 7/2004 | Oppenheimer et al. |
| 2004/0128236 A1 | 7/2004 | Brown et al. |
| 2004/0133493 A1 | 7/2004 | Ford et al. |
| 2004/0138995 A1 | 7/2004 | Hershkowitz et al. |
| 2004/0143546 A1 | 7/2004 | Wood et al. |
| 2004/0153437 A1 | 8/2004 | Buchan |
| 2004/0153448 A1 | 8/2004 | Cheng et al. |
| 2004/0158520 A1 | 8/2004 | Noh |
| 2004/0158521 A1 | 8/2004 | Newton |
| 2004/0159700 A1 | 8/2004 | Khan et al. |
| 2004/0177030 A1 | 9/2004 | Shoham |
| 2004/0186807 A1* | 9/2004 | Nathans .............. G06Q 40/025 705/38 |
| 2004/0193535 A1 | 9/2004 | Barazesh |
| 2004/0199456 A1 | 10/2004 | Flint et al. |
| 2004/0199462 A1 | 10/2004 | Starrs |
| 2004/0205157 A1 | 10/2004 | Bibelnieks et al. |
| 2004/0215553 A1 | 10/2004 | Gang et al. |
| 2004/0215584 A1 | 10/2004 | Yao |
| 2004/0220896 A1 | 11/2004 | Finlay et al. |
| 2004/0225596 A1 | 11/2004 | Kemper et al. |
| 2004/0230534 A1 | 11/2004 | McGough |
| 2004/0243450 A1 | 12/2004 | Bernard, Jr. et al. |
| 2004/0243506 A1 | 12/2004 | Das |
| 2004/0243588 A1 | 12/2004 | Tanner et al. |
| 2004/0249532 A1 | 12/2004 | Kelly et al. |
| 2004/0255127 A1 | 12/2004 | Arnouse |
| 2005/0004805 A1 | 1/2005 | Srinivasan |
| 2005/0004855 A1 | 1/2005 | Jenson et al. |
| 2005/0027632 A1 | 2/2005 | Zeitoun et al. |
| 2005/0027633 A1 | 2/2005 | Fortuna et al. |
| 2005/0038726 A1 | 2/2005 | Salomon et al. |
| 2005/0055275 A1 | 3/2005 | Newman et al. |
| 2005/0080697 A1 | 4/2005 | Foss et al. |
| 2005/0080821 A1 | 4/2005 | Breil et al. |
| 2005/0086126 A1 | 4/2005 | Patterson |
| 2005/0086176 A1 | 4/2005 | Dahlgren |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102206 A1 | 5/2005 | Savasoglu et al. |
| 2005/0102226 A1 | 5/2005 | Oppenheimer et al. |
| 2005/0105719 A1 | 5/2005 | Hada |
| 2005/0125291 A1 | 6/2005 | Demkiw Grayson et al. |
| 2005/0125350 A1 | 6/2005 | Tidwell et al. |
| 2005/0130704 A1 | 6/2005 | McParland et al. |
| 2005/0137963 A1 | 6/2005 | Ricketts et al. |
| 2005/0144067 A1 | 6/2005 | Farahat et al. |
| 2005/0154617 A1 | 7/2005 | Ruggieri et al. |
| 2005/0154664 A1 | 7/2005 | Guy et al. |
| 2005/0154769 A1 | 7/2005 | Eckart et al. |
| 2005/0159996 A1 | 7/2005 | Lazarus et al. |
| 2005/0197953 A1 | 9/2005 | Broadbent et al. |
| 2005/0197954 A1 | 9/2005 | Maitland et al. |
| 2005/0209892 A1 | 9/2005 | Miller |
| 2005/0209922 A1 | 9/2005 | Hofmeister |
| 2005/0246256 A1 | 11/2005 | Gastineau et al. |
| 2005/0267840 A1 | 12/2005 | Holm-Blagg et al. |
| 2005/0273431 A1 | 12/2005 | Abel et al. |
| 2005/0278246 A1 | 12/2005 | Friedman et al. |
| 2005/0279827 A1 | 12/2005 | Mascavage et al. |
| 2005/0288954 A1 | 12/2005 | McCarthy et al. |
| 2005/0288998 A1 | 12/2005 | Verma et al. |
| 2006/0014129 A1 | 1/2006 | Coleman et al. |
| 2006/0031158 A1 | 2/2006 | Orman |
| 2006/0036543 A1 | 2/2006 | Blagg et al. |
| 2006/0041443 A1 | 2/2006 | Horvath |
| 2006/0059073 A1 | 3/2006 | Walzak |
| 2006/0080251 A1 | 4/2006 | Fried et al. |
| 2006/0095363 A1 | 5/2006 | May |
| 2006/0100954 A1 | 5/2006 | Schoen |
| 2006/0122921 A1 | 6/2006 | Comerford et al. |
| 2006/0123461 A1 | 6/2006 | Lunt et al. |
| 2006/0129428 A1 | 6/2006 | Wennberg |
| 2006/0149674 A1* | 7/2006 | Cook .................. G06Q 20/40 705/44 |
| 2006/0155639 A1 | 7/2006 | Lynch et al. |
| 2006/0163347 A1 | 7/2006 | Foss et al. |

(56) References Cited

U.S. PATENT DOCUMENTS

| | | |
|---|---|---|
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0212386 A1 | 9/2006 | Willey et al. |
| 2006/0229799 A1 | 10/2006 | Nimmo et al. |
| 2006/0229996 A1* | 10/2006 | Keithley ............... G06Q 20/401 705/75 |
| 2006/0233332 A1 | 10/2006 | Toms |
| 2006/0242046 A1 | 10/2006 | Haggerty et al. |
| 2006/0242048 A1 | 10/2006 | Haggerty et al. |
| 2006/0259364 A1 | 11/2006 | Strock et al. |
| 2006/0265323 A1 | 11/2006 | Winter et al. |
| 2006/0271633 A1 | 11/2006 | Adler |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293921 A1 | 12/2006 | McCarthy et al. |
| 2006/0294199 A1 | 12/2006 | Bertholf |
| 2007/0011039 A1 | 1/2007 | Oddo |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0038568 A1 | 2/2007 | Greene et al. |
| 2007/0067206 A1 | 3/2007 | Haggerty et al. |
| 2007/0067297 A1 | 3/2007 | Kublickis |
| 2007/0067437 A1 | 3/2007 | Sindambiwe |
| 2007/0078741 A1 | 4/2007 | Haggerty et al. |
| 2007/0083460 A1 | 4/2007 | Bachenheimer |
| 2007/0083463 A1 | 4/2007 | Kraft |
| 2007/0094137 A1 | 4/2007 | Phillips et al. |
| 2007/0100719 A1 | 5/2007 | Chwast et al. |
| 2007/0106582 A1 | 5/2007 | Baker et al. |
| 2007/0112668 A1 | 5/2007 | Celano et al. |
| 2007/0156718 A1 | 7/2007 | Hossfeld et al. |
| 2007/0168246 A1 | 7/2007 | Haggerty et al. |
| 2007/0168267 A1 | 7/2007 | Zimmerman et al. |
| 2007/0179798 A1 | 8/2007 | Inbarajan |
| 2007/0208640 A1 | 9/2007 | Banasiak et al. |
| 2007/0214000 A1 | 9/2007 | Shahrabi et al. |
| 2007/0226093 A1 | 9/2007 | Chan et al. |
| 2007/0226114 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0266439 A1 | 11/2007 | Kraft |
| 2007/0282736 A1 | 12/2007 | Conlin et al. |
| 2007/0288338 A1 | 12/2007 | Hoadley |
| 2007/0288360 A1 | 12/2007 | Seeklus |
| 2007/0299770 A1 | 12/2007 | Delinsky |
| 2007/0299771 A1 | 12/2007 | Brody |
| 2008/0010203 A1 | 1/2008 | Grant |
| 2008/0059364 A1 | 3/2008 | Tidwell et al. |
| 2008/0065530 A1* | 3/2008 | Talbert ................ G06Q 30/02 705/38 |
| 2008/0103959 A1 | 5/2008 | Carroll et al. |
| 2008/0103972 A1 | 5/2008 | Lanc |
| 2008/0109740 A1 | 5/2008 | Prinsen et al. |
| 2008/0120155 A1 | 5/2008 | Pliha |
| 2008/0133278 A1 | 6/2008 | Stanfield |
| 2008/0133322 A1 | 6/2008 | Kalia et al. |
| 2008/0133325 A1 | 6/2008 | De et al. |
| 2008/0140507 A1 | 6/2008 | Hamlisch et al. |
| 2008/0147454 A1 | 6/2008 | Walker et al. |
| 2008/0154766 A1 | 6/2008 | Lewis et al. |
| 2008/0162383 A1 | 7/2008 | Kraft |
| 2008/0167883 A1 | 7/2008 | Thavildar Khazaneh |
| 2008/0172324 A1 | 7/2008 | Johnson |
| 2008/0177655 A1 | 7/2008 | Zalik |
| 2008/0195548 A1 | 8/2008 | Chu et al. |
| 2008/0201257 A1 | 8/2008 | Lewis et al. |
| 2008/0215470 A1 | 9/2008 | Sengupta et al. |
| 2008/0221970 A1 | 9/2008 | Megdal et al. |
| 2008/0221990 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0243680 A1 | 10/2008 | Megdal et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0294540 A1 | 11/2008 | Celka et al. |
| 2008/0301016 A1 | 12/2008 | Durvasula et al. |
| 2008/0312969 A1 | 12/2008 | Raines et al. |
| 2009/0006185 A1 | 1/2009 | Stinson |
| 2009/0007231 A1 | 1/2009 | Kaiser et al. |
| 2009/0012889 A1 | 1/2009 | Finch |
| 2009/0024505 A1 | 1/2009 | Patel et al. |
| 2009/0043637 A1 | 2/2009 | Eder |
| 2009/0044279 A1 | 2/2009 | Crawford et al. |
| 2009/0048877 A1 | 2/2009 | Binns et al. |
| 2009/0055322 A1 | 2/2009 | Bykov et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0099960 A1 | 4/2009 | Robida et al. |
| 2009/0106846 A1 | 4/2009 | Dupray et al. |
| 2009/0119199 A1 | 5/2009 | Salahi |
| 2009/0119299 A1 | 5/2009 | Rhodes |
| 2009/0126013 A1 | 5/2009 | Atwood et al. |
| 2009/0132347 A1 | 5/2009 | Anderson et al. |
| 2009/0144160 A1 | 6/2009 | Haggerty et al. |
| 2009/0158030 A1 | 6/2009 | Rasti |
| 2009/0164380 A1 | 6/2009 | Brown |
| 2009/0171723 A1 | 7/2009 | Jenkins |
| 2009/0182653 A1 | 7/2009 | Zimiles |
| 2009/0198557 A1 | 8/2009 | Wang et al. |
| 2009/0198602 A1 | 8/2009 | Wang et al. |
| 2009/0199264 A1 | 8/2009 | Lang |
| 2009/0210886 A1 | 8/2009 | Bhojwani et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0234775 A1 | 9/2009 | Whitney et al. |
| 2009/0240624 A1 | 9/2009 | James et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0271248 A1 | 10/2009 | Sherman et al. |
| 2009/0276368 A1 | 11/2009 | Martin et al. |
| 2009/0289110 A1 | 11/2009 | Regen et al. |
| 2009/0313163 A1 | 12/2009 | Wang et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0023434 A1 | 1/2010 | Bond |
| 2010/0082476 A1 | 4/2010 | Bowman |
| 2010/0094774 A1 | 4/2010 | Jackowitz et al. |
| 2010/0114724 A1 | 5/2010 | Ghosh et al. |
| 2010/0114744 A1 | 5/2010 | Gonen |
| 2010/0145836 A1 | 6/2010 | Baker et al. |
| 2010/0174638 A1 | 7/2010 | Debie et al. |
| 2010/0223168 A1 | 9/2010 | Haggerty et al. |
| 2010/0228658 A1 | 9/2010 | Ketelsen et al. |
| 2010/0250411 A1* | 9/2010 | Ogrodski ............... G06Q 10/10 705/30 |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0299251 A1 | 11/2010 | Thomas |
| 2010/0299252 A1 | 11/2010 | Thomas |
| 2010/0299260 A1 | 11/2010 | Thomas |

(56) References Cited

U.S. PATENT DOCUMENTS

| | | | |
|---|---|---|---|
| 2010/0324986 A1 | 12/2010 | Thomas | |
| 2010/0325036 A1 | 12/2010 | Thomas | |
| 2010/0332292 A1 | 12/2010 | Anderson | |
| 2011/0004514 A1 | 1/2011 | Thomas | |
| 2011/0004546 A1 | 1/2011 | Thomas | |
| 2011/0029427 A1 | 2/2011 | Haggerty et al. | |
| 2011/0047071 A1 | 2/2011 | Choudhuri et al. | |
| 2011/0060654 A1 | 3/2011 | Elliott et al. | |
| 2011/0060673 A1 | 3/2011 | Delinsky et al. | |
| 2011/0071950 A1 | 3/2011 | Ivanovic | |
| 2011/0093383 A1 | 4/2011 | Haggerty et al. | |
| 2011/0112950 A1 | 5/2011 | Haggerty et al. | |
| 2011/0112958 A1 | 5/2011 | Haggerty et al. | |
| 2011/0145122 A1 | 6/2011 | Haggerty et al. | |
| 2011/0166988 A1 | 7/2011 | Coulter | |
| 2011/0178841 A1 | 7/2011 | Rane et al. | |
| 2011/0178899 A1 | 7/2011 | Huszar | |
| 2011/0184838 A1 | 7/2011 | Winters et al. | |
| 2011/0196791 A1 | 8/2011 | Dominguez | |
| 2011/0251946 A1 | 10/2011 | Haggerty et al. | |
| 2011/0270727 A1* | 11/2011 | Kasower | G06Q 40/00 705/35 |
| 2011/0282779 A1 | 11/2011 | Megdal et al. | |
| 2011/0295733 A1 | 12/2011 | Megdal et al. | |
| 2012/0005070 A1 | 1/2012 | McFall et al. | |
| 2012/0047219 A1 | 2/2012 | Feng et al. | |
| 2012/0054090 A1 | 3/2012 | Haggerty et al. | |
| 2012/0066065 A1 | 3/2012 | Switzer | |
| 2012/0066106 A1 | 3/2012 | Papadimitriou | |
| 2012/0101938 A1 | 4/2012 | Kasower | |
| 2012/0101939 A1 | 4/2012 | Kasower | |
| 2012/0116951 A1 | 5/2012 | Chung et al. | |
| 2012/0123931 A1 | 5/2012 | Megdal et al. | |
| 2012/0136774 A1 | 5/2012 | Imrey et al. | |
| 2012/0158574 A1 | 6/2012 | Brunzell et al. | |
| 2012/0216125 A1 | 8/2012 | Pierce | |
| 2012/0253852 A1 | 10/2012 | Pourfallah et al. | |
| 2012/0265661 A1 | 10/2012 | Megdal et al. | |
| 2012/0278767 A1 | 11/2012 | Stibel et al. | |
| 2012/0317016 A1 | 12/2012 | Hughes | |
| 2012/0323954 A1 | 12/2012 | Bonalle et al. | |
| 2012/0324388 A1 | 12/2012 | Rao et al. | |
| 2013/0006825 A1 | 1/2013 | Robida et al. | |
| 2013/0103571 A1 | 4/2013 | Chung et al. | |
| 2013/0110565 A1 | 5/2013 | Means et al. | |
| 2013/0117087 A1 | 5/2013 | Coppinger | |
| 2013/0124392 A1* | 5/2013 | Achanta | G06Q 40/00 705/38 |
| 2013/0173451 A1 | 7/2013 | Kornegay et al. | |
| 2013/0173481 A1 | 7/2013 | Hirtenstein et al. | |
| 2013/0191261 A1* | 7/2013 | Chandler | G06Q 40/025 705/35 |
| 2013/0205135 A1 | 8/2013 | Lutz | |
| 2013/0218638 A1 | 8/2013 | Kilger et al. | |
| 2013/0332338 A1 | 12/2013 | Yan et al. | |
| 2013/0332341 A1 | 12/2013 | Papadimitriou | |
| 2013/0339249 A1 | 12/2013 | Weller et al. | |
| 2014/0012734 A1 | 1/2014 | Megdal et al. | |
| 2014/0032300 A1 | 1/2014 | Zhang et al. | |
| 2014/0032723 A1 | 1/2014 | Nema | |
| 2014/0061302 A1 | 3/2014 | Hammad | |
| 2014/0110477 A1 | 4/2014 | Hammad | |
| 2014/0156501 A1 | 6/2014 | Howe | |
| 2014/0258089 A1 | 9/2014 | Pearson et al. | |
| 2014/0279329 A1 | 9/2014 | Dancel | |
| 2015/0026014 A1 | 1/2015 | Kasower | |
| 2015/0228016 A1 | 8/2015 | Chandler | |
| 2015/0310543 A1 | 10/2015 | DeBie | |

FOREIGN PATENT DOCUMENTS

| | | |
|---|---|---|
| EP | 0 458 698 | 11/1991 |
| EP | 0 468 440 | 1/1992 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 919 942 | 6/1999 |
| EP | 0 977 128 | 2/2000 |
| EP | 1 028 401 | 8/2000 |
| EP | 1 077 419 | 2/2001 |
| EP | 0 772 836 | 12/2001 |
| EP | 2 088 743 | 8/2009 |
| JP | 10-222559 | 8/1998 |
| JP | 10-261009 | 9/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-016261 | 1/2003 |
| JP | 2003-271851 | 9/2003 |
| JP | 2003-316881 | 11/2003 |
| JP | 2003-316950 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| TW | 256569 | 6/2006 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 99/46710 | 9/1999 |
| WO | WO 00/04465 | 1/2000 |
| WO | WO 00/11574 | 3/2000 |
| WO | WO 00/28441 | 5/2000 |
| WO | WO 01/16896 | 3/2001 |
| WO | WO 01/39090 | 5/2001 |
| WO | WO 01/39589 | 6/2001 |
| WO | WO 01/41083 | 6/2001 |
| WO | WO 01/57720 | 8/2001 |
| WO | WO 01/80053 | 10/2001 |
| WO | WO 01/84281 | 11/2001 |
| WO | WO 2004/114160 | 12/2004 |
| WO | WO 2005/022348 | 3/2005 |
| WO | WO 2005/124619 | 12/2005 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2008/022289 | 2/2008 |
| WO | WO 2008/147918 | 12/2008 |
| WO | WO 2009/061342 | 5/2009 |
| WO | WO 2009/064840 | 5/2009 |
| WO | WO 2009/099448 | 8/2009 |
| WO | WO 2009/132114 | 10/2009 |
| WO | WO 2010/062537 | 6/2010 |
| WO | WO 2010/129257 | * 11/2010 |

OTHER PUBLICATIONS

Abrahams, Steven W., "The New View in Mortgage Prepayments: Insight from Analysis at the Loan-By-Loan Level," The Journal of Fixed Income, Jun. 1997, vol. 7, No. 1, pp. 8-21.

AISG's National Underwriting Database, A-PLUS, is Now the Largest in the Industry, Business Wire, Aug. 7, 1997.

(56) References Cited

OTHER PUBLICATIONS

Announcing TrueProfiler, http://web.archive.org/web/20021201123646/http://www.truecredit.com/index.asp, dated Dec. 1, 2002, 2 pages.
"AT&T Expected to Turn Up Heat in Card Wars", American Banker, May 27, 1993, vol. 158, No. 101, pp. 3.
Avery et al., "Consumer Credit Scoring: Do Situational Circumstances Matter?", Journal of Banking & Finance, vol. 28, 2004, pp. 835-856.
Awoonor-Williams, Princess Josephine, Ph.D. "Gender and Credit: An Analysis of Women's Experience in the Credit Market", ProQuest Dissertations and Theses, 2004, pp. 148.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality to Meet Day-To-Day Treasury Needs", Business Wire, Oct. 25, 1999. pp. 2.
Barone, Robert P., "The Integrated Approach to Branch Service Delivery," American Banker, Aug. 6, 1991, http://www.highbeam.com/doc/1G1-11128400.html.
Bilotta, Caryn, "Understanding Credit Scores," Pittsburgh Post—Gazette, May 9, 2010.
Brown et al., "ALCOD IDSS:Assisting the Australian Stock Market Surveillance Team's Review Process," Applied Artificial Intelligence Journal, Dec. 1, 1996, pp. 625-641.
Cantor, R. and Packer, F., "The Credit Rating Industry," FRBNY Quarterly Review, Summer-Fall, 1994, pp. 1-24.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chores & Allowances, "Do Kids Have Credit Reports?" Oct. 15, 2007, http://choresandallowances.blogspot.com/2007/10/do-kids-have-cre6t-reports.html, pp. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/Individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Consumer Reports, "Consumer Reports Finds American-Made Vehicles Close Reliability Gap with European-Made Vehicles—As Japanese Continue to Set New Benchmarks for the Industry", http://www.consumerreports.org/content/Pressroom/Presseng/PDF/eng0304rel.pdf, Apr. 2003, pp. 2.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203.Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsilidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_ref17.pdf, Jun. 18, 2004, Chapter 17, pp. 311-382.
Dillon et al., "Good Science", Marketing Research: A Magazine of Management & Applications™, Winter 1997, vol. 9, No. 4; pp. 11.
Downing, Jr.; Richard, "Changes to the Credit Reporting Act," Mortgage Banking, Apr. 1, 1998, vol. 58, No. 7, pp. 82-85.
Ecredable: Discover your AMP Credit Rating™, http://www.ecredable.com/how-it-works/amp-credit-rating printed Oct. 12, 2012 in 2 pages.
Equifax: Consumer Bureau, http://www.equifax.co.in/financial-services/consumer_bureau/en_in#RiskScore printed Oct. 12, 2012 in 3 pages.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian, http://www.experian.com/ printed Oct. 12, 2012 in 1 page.
Experian Announces PLUS Score; Experian Press Release dated Oct. 16, 2003; Experian Global Press Office.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, as printed Jun. 8, 2005 in 2 pages, http://www.myfico.com/CreditEducation/Calculators/CreditAssessment.aspx.

(56) References Cited

OTHER PUBLICATIONS

Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.myfico.com/Products/FICOKit/Sample01.html.
Fair Isaac Corporation, myFICO: Sample: FICO Score Simulator, as printed Jun. 8, 2005 in 5 pages, http://www.myfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulatorResults.asp?Simulation=4&ReportID=1&productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28>.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulatorResults.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulatorResults.asp?textfield222=5000&Simulation=6&ReportID=1&ProductID=&TransferBalance.x=86&TransferBalance.y=24.
FamilySecure.com; "Identity Theft Protection for the Whole Family | FamilySecure.com" http://www.familysecure.com/, as retrieved on Nov. 5, 2009.

Fickenscher, Lisa, "Merchant American Express Seeks to Mine its Data on Cardholder Spending Patterns," American Banker, vol. 162, Issue 56, Mar. 24, 1997, pp. 1-2.
Financial Engines, http://corp.financialengines.com/ printed Oct. 12, 2012 in 1 page.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
Frank, John, "Scoring Takes on a New Meaning," Credit Card Management, Sep. 1996, vol. 9, No. 6, pp. 155-159.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/goh_tp_pieasset.html, http://www.fundmanagesofware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Keeping Tabs on Businesses That Keep Tabs on Us", NewsRoom, The Seattle Times, Section: SCENE, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
"Green Tree Investors May Go to Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Healy, Thomas J., "The New Science of Borrower Behavior," Mortgage Banking, vol. 58, No. 5, pp. 26-35, Feb. 1, 1998.
Hill, Kerry, "Identity Theft Your Social Security Number Provides Avenue for Thieves", NewsRoom, Wisconsin State Journal, Sep. 13, 1998, pp. 4.
ID Theft Assist, "Do You Know Where Your Child's Credit Is?", Nov. 26, 2007, http://www.idtheftassist.com/pages/story14, pp. 3.
Ideon, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
Instant Access to Credit Reports Now Available Online with DMS' CreditBrowser-based system also Simplifies Credit Decisioning and Offers a Central Point of Control, Business Wire, p. 0264, Dallas, May 23, 2000.
"Intelligent Miner Applications Guide", IBM Corp., Apr. 2, 1999, Chapters 4-7, pp. 33-132.
Internal Revenue Service Data Book 2000, Issued Aug. 2001, Revised May 2003.
"Japan's JAAI system appraises used cars over internet", Asia Pulse, Mar. 3, 2000.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kulkosky, Edward, "Credit Scoring Appeal Transcends Underwriting," American Banker, vol. 161, No. 93, p. 8, May 15, 1996.

(56) References Cited

OTHER PUBLICATIONS

Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-software, Includes Discussion thread, Fourth Quarter 2011, pp. 17.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
LifeLock, "Identity Theft F.A.Q." http://web.archive.org/web/20080215093614/http://www.indentitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Merriam Webster's Collegiate Dictionary, 10th Edition, 1999, p. 79.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Montgomery County Housing Report, Residential Market Report, Jan. 2004 in 6 pages.
MyFico, http://www.myfico.com/products/ficoone/sample/sample_scoresimulator.aspx printed Oct. 12, 2012 in 3 pages.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New Privista Product Provides Early Warning System to Combat Identity Theft", PR Newswire, Oct. 24, 2000, PR Newswire Association, Inc., New York.
"New for Investors: Asset Allocation, Seasoned Returns and More," Prosper, http://blog.prosper.com/2011/10/27/new-for-investors-asset-alocation-seasoned-returns-and-more/, pp. 4.

Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Partnoy, Frank, Rethinking Regulation of Credit Rating Agencies: An Institutional Investor Perspective, Council of Institutional Investors, Apr. 2009, pp. 21.
Powerforms: Declarative Client-Side for Field Validation, ISSN 1386-145x, Dec. 2000.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Saunders, A., "Data Goldmine," Management Today, London: Mar. 1, 2004, 6 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http:web.archive.org/web/20000419070107/http://www.wcco.com/news/stories/news-971204-092238.html.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Steele, Georgia, "Fair, Isaac Seeks Mortgage Tech Opportunities," National Mortgage News, Special Report; B& C Lending, Mar. 23, 1998, p. 34.
Sullivan, Deidre, "Scoring Borrower Risk," Mortgage Banking, Nov. 1994, vol. 55, No. 2, pp. 94-98.
Taylor, Marshall, "Loan-Level Pricing Draws Interest From Investors," Real Estate Finance Today, Jul. 7, 1997, vol. 14, No. 14. p. 10.
"The Best of the Best," Mortgage Technology, Nov. 1, 2003, vol. 10, No. 8, pp. 34-53.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion: VantageScore®—Consistency in Credit Scoring, http://www.transunion.com/personal-credit/credit-reports/vantagescore.page printed Oct. 12, 2012 in 2 pages.
Trulia, "Trulia Estimates," http://www.trulia.com/trulia_estimates/, printed Feb. 18, 2014 in 2 pages.

(56) References Cited

OTHER PUBLICATIONS

Tuman, Diane, "What is a Zestimate?" Mar. 2013, pp. 5, http://www.zillow.com/wikipages/What-is-a-Zestimate/.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Wahl, Martin, "The Stampede to Subprime," Mortgage Banking, Oct. 1, 1997, vol. 58, No. 1, p. 26(7).
"WashingtonPost.com and Cars.com launch comprehensive automotive web site for the Washington area", PR Newswire, Oct. 22, 1998.
Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
West, David, "Neural Network Credit Scoring Models", Computers & Operations Research, vol. 27, 2000, pp. 1131-1152.
Yang, et al., "An Analysis of the Ex Ante Probabilities of Mortgage Prepayment and Default", Real Estate Economics, Dec. 1998, vol. 26, No. 4, pp. 651-676.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Instant Rules GUI, www.zootweb.com/instant_rules_GUI.html as printed Mar. 3, 2008.
Zoot—Rules Management GUI, www.zootweb.com/business_rules_GUI.html as printed Mar. 3, 2008.
EFunds Introduces QualiFileSM, Deluxe Corporation, eFunds Press Release and Product Launch, Sep. 23, 1999, Milwaukee, WI.
Experian, Custom Strategist and Qualifile from Funds, 2000, in 2 pages.
Application as filed in U.S. Appl. No. 09/653,595, dated Aug. 31, 2000.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
U.S. Appl. No. 12/705,489, filed Feb. 12, 2010, Bargoli et al.
U.S. Appl. No. 12/705,511, filed Feb. 12, 2010, Bargoli et al.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
BackupBox, http://mybackupbox.com printed Feb. 8, 2013 in 2 pages.
Bitran et al., "Mailing Decisions in Catalog Sales Industry", Management Science (JSTOR), vol. 42, No. 9, pp. 1364-1381, Sep. 1996.
Bult et al., "Optimal Selection for Direct Mail," Marketing Science, 1995, vol. 14, No. 4, pp. 378-394.
Caliendo, et al., "Some Practical Guidance for the Implementation of Propensity Score Matching", IZA:Discussion Paper Series, No. 1588, Germany, May 2005, pp. 32.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Cowie, Norman, "Warning Bells & 'The Bust-Out'", Business Credit, Jul. 1, 2000, pp. 5.
EFunds Corporation, "Data & Decisioning: Debit Report" printed Apr. 1, 2007, http://www.efunds.com/web/industry-solutions/financial-services/frm-debit-report/htm in 1 page.
Elmasri et al., "Fundamentals of Database Systems, Third Edition (Excerpts)", Jun. 2000, pp. 253, 261, 268-70, 278-80, 585, 595.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Fanelli, Marc, "Building a Holistic Customer View", MultiChannel Merchant, Jun. 26, 2006, pp. 2.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
IFTTT, "About IFTTT," http://ifttt.com/wtf printed Feb. 18, 2013 in 4 pages.
Jacob et al., A Case Study of Checking Account Inquiries and Closures in Chicago, The Center for Financial Services Innovation, Nov. 2006.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Miller, Joe, "NADA used-car prices go online", Automotive News, Jun. 14, 1999, p. 36.
Mint.com, http://www.mint.com/how-it-works/ printed Feb. 5, 2013 in 2 pages.
Mover, "One API for the Cloud," http://mover.io printed Feb. 6, 2013 in 3 pages.
Otixo, "Your Dashboard for the Cloud," http://Otixo.com/product printed Feb. 6, 2013 in 3 pages.
Pagano, et al., "Information Sharing in Credit Markets," Dec. 1993, The Journal of Finance, vol. 48, No. 5, pp. 1693-1718.
Pipes, http://pipes.yahoo.com/pipes printed Feb. 18, 2013 in 1 page.
Planwise, http://planwise.com printed Feb. 8, 2013 in 5 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Primadesk, http://primadesk.com printed Feb. 8, 2013 in 1 page.
RapUP, Attribute Management & Report Systems:Absolute Advantage!, Magnum Communications Brochure, Copyright 2004, pp. 5.
Sawyers, Arlena, "NADA to Offer Residual Guide", Automotive News, May 22, 2000, p. 3.
Schmittlein et al., "Customer Base Analysis: An Industrial Purchase Process Application", Marketing Science, vol. 13, No. 1, Winter 1994, pp. 41-67.
ServiceObjects, "DOTS Web Services—Product Directory", http://www.serviceobjects.com/products/directory_of_web_services.asp printed Aug. 17, 2006 in 4 pages.

(56) References Cited

OTHER PUBLICATIONS

Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.

Stein, Benchmarking Default Prediction Models: Pitfalls and Remedies in Model Validation, Moody's KMV, Revised Jun. 13, 2002, Technical Report #020305; New York.

Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.

Storage Made Easy(SME), http://storagemadeeasy.com printed Feb. 6, 2013 in 1 page.

Sumner, Anthony, "Tackling the Issue of Bust-Out Fraud", Retail Banker International, Jul. 24, 2007, pp. 4.

Tao, Lixin, "Shifting Paradigms with the Application Service Provider Model"; Concordia University, IEEE, Oct. 2001, Canada.

Thoemmes, Felix, "Propensity Score Matching in SPSS", Center for Educational Science and Psychology, University of Tübingen, Jan. 2012.

Working, Holbrook, "Statistical Laws of Family Expenditure", Journal of the American Statistical Association, pp. 43-56, vol. 38, American Statistical Association, Washington, D.C., Mar. 1943.

Zapier, "Integrate Your Web Services," http://www.Zapier.com printed Feb. 18, 2013 in 3 pages.

International Search Report and Written Opinion for Application No. PCT/US2007/006070, dated Nov. 10, 2008.

International Search Report and Written Opinion for Application No. PCT/US2007/063822, dated Sep. 11, 2007.

International Search Report and Written Opinion for Application No. PCT/US2007/063823, dated Oct. 24, 2007.

International Search Report and Written Opinion for Application No. PCT/US2007/063824, dated Oct. 3, 2007.

\* cited by examiner

| FIELD | VALUE |
| --- | --- |
| First Name | John |
| Last Name | Doe |
| Address | 100 Main Street |
| SS Number | 123456789 |
| Customer PIN | 1234567 |
| Entry Date | 7/31/2007 |
| Account #1 Provider | Credit Provider #1 |
| Account #1 Status | 30 DPD |
| Account #1 Balance | $1,500.00 |
| Accoutn #1 Amount Due | $500.00 |
| Account #1 Last Payment Date | 7/10/2007 |
| Account #1 Last Payment Amount | $500.00 |
| Account #2 Provider | Credit Provider #2 |
| Account #2 Status | on-time |
| Account #2 Balance | $250.00 |
| Account #2 Amount Due | $15.00 |
| Account #2 Last Payment Date | 7/12/2007 |
| Account #2 Last Payment Amount | $1,000.00 |

FIG. 4A

| FIELD | VALUE |
| --- | --- |
| First Name | John |
| Last Name | Doe |
| Address | 100 Main Street |
| SS Number | 123456789 |
| Customer PIN | 1234567 |
| Entry Date | 6/30/2007 |
| Account #1 Provider | Credit Provider #1 |
| Account #1 Status | 60 DPD |
| Account #1 Balance | $2,000.00 |
| Account #1 Amount Due | $750.00 |
| Account #1 Last Payment Date | 6/9/2007 |
| Account #1 Last Payment Amount | $500.00 |
| Account #2 Provider | Credit Provider #2 |
| Account #2 Status | 90 DPD |
| Account #2 Balance | $1,250.00 |
| Account #2 Amount Due | $250.00 |
| Account #2 Last Payment Date | 2/1/2007 |
| Account #2 Last Payment Amount | $50.00 |

FIG. 4B

DATABASE SYSTEM FOR TRIGGERING EVENT NOTIFICATIONS BASED ON UPDATES TO DATABASE RECORDS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation-in-part of U.S. patent application Ser. No. 12/239,647, filed Sep. 26, 2008, and titled "SYSTEMS AND METHODS FOR MONITORING FINANCIAL ACTIVITIES OF CONSUMERS," which application claims benefit of U.S. Provisional Patent Application No. 60/975,754, filed Sep. 27, 2007, and titled "SYSTEMS AND METHODS FOR MONITORING CREDIT ACTIVITY CHANGES AND GENERATING ALERTS." This application also claims benefit of U.S. Provisional Patent Application No. 62/316,399, filed Mar. 31, 2016, and titled "DATABASE SYSTEM FOR TRIGGERING EVENT NOTIFICATIONS BASED ON UPDATES TO DATABASE RECORDS." The entire disclosure of each of the above items is hereby made part of this specification as if set forth fully herein and incorporated by reference for all purposes, for all that it contains.

TECHNICAL FIELD

Embodiments of the present disclosure relate to data processing, including database and file management, as well as a database system for accessing one or more databases or other data structures, and triggering event notifications based on updates to database records.

BACKGROUND

Electronic databases provide for storage and retrieval of digital data records. Data records in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for triggering event notifications (also referred to herein as "notifications" or "alerts") based on updates to database records. The system may advantageously provide notifications to interested users of certain types of changes to certain database records. For example, a user may be interested a particular database record, and more specifically to a particular type of change to the particular database record. The system advantageously, upon a change to the particular database record, may determine that the user is interested in changes to the particular database record, and may thus generate a log of the change. Then, the system may then determine that the change that was logged is of the particular type, and may thus generate and send a notification to the user. Further, advantageously, the notification may include information about the change that may be quite useful to the user.

In some implementations, the system may store a history of previous notifications. Thus, for example, the system may advantageously avoid sending out duplicate notifications, and/or may prioritize particular notifications. Further, the system may determine that notifications are to be generated based on historical data.

In some implementations, the system may receive, from various users, indications of triggers that may be implemented by the system. A trigger may be associated with a particular user, such that notifications resulting from that trigger are sent to the user. In some implementations, the notification may cause activation of a device or software application, enabling rapid notification and/or automation activities.

In some implementations, the system may process hundreds of millions (or more) of data record updates each day, and may determine and generate millions (or more) of triggers and event notifications each day. Accordingly, in various embodiments, large amounts of data are automatically and dynamically processed in response to user inputs.

Various embodiments of the present disclosure provide improvements to various technologies and technological fields. For example, existing database systems may lack notifications. The present disclosure describes improvements to, and useful applications of, database systems. For example, the database system disclosed here, according to various embodiments, efficiently monitors a database for triggering events, and dynamically generates notifications in response to those triggering events. Additionally, various embodiments of the present disclosure are inextricably tied to computer technology. In particular, various systems and methods discussed herein provide monitoring of electronic databases, processing of large volumes of data items, generation and transmission of electronic notifications, and the like. Such features and others are intimately tied to, and enabled by, computer technology, and would not exist except for computer technology. Further, the implementation of the various embodiments of the present disclosure via computer technology enables many of the advantages described herein, including more efficient processing of various types of electronic data.

According to an embodiment, a database system is disclosed for triggering event notifications based on updates to database records. The database system may comprise a first database including a plurality of records; a second database including a plurality of trigger indicators; and a hardware processor configured to execute computer-executable instructions. The hardware processor may be configured to execute computer-executable instructions in order to: receive an update data item; identify, in the first database, a first record of the plurality of records corresponding to the update data item; cause an update to the first record based on information included with the update data item; generate a log of the update to the first record; compare the log of the update to the plurality of trigger indicators included in the second database; identify, in the second database, a first trigger indicator of the plurality of trigger indicators corresponding to the update to the first record; determine that a type of the first trigger indicator matches a type of the update to the first record; and generate an event notification including information included in the update.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4A shows a database record, according to an embodiment;

FIG. 4B shows a historical database record, according to an embodiment; and

DETAILED DESCRIPTION

Figure 1A:
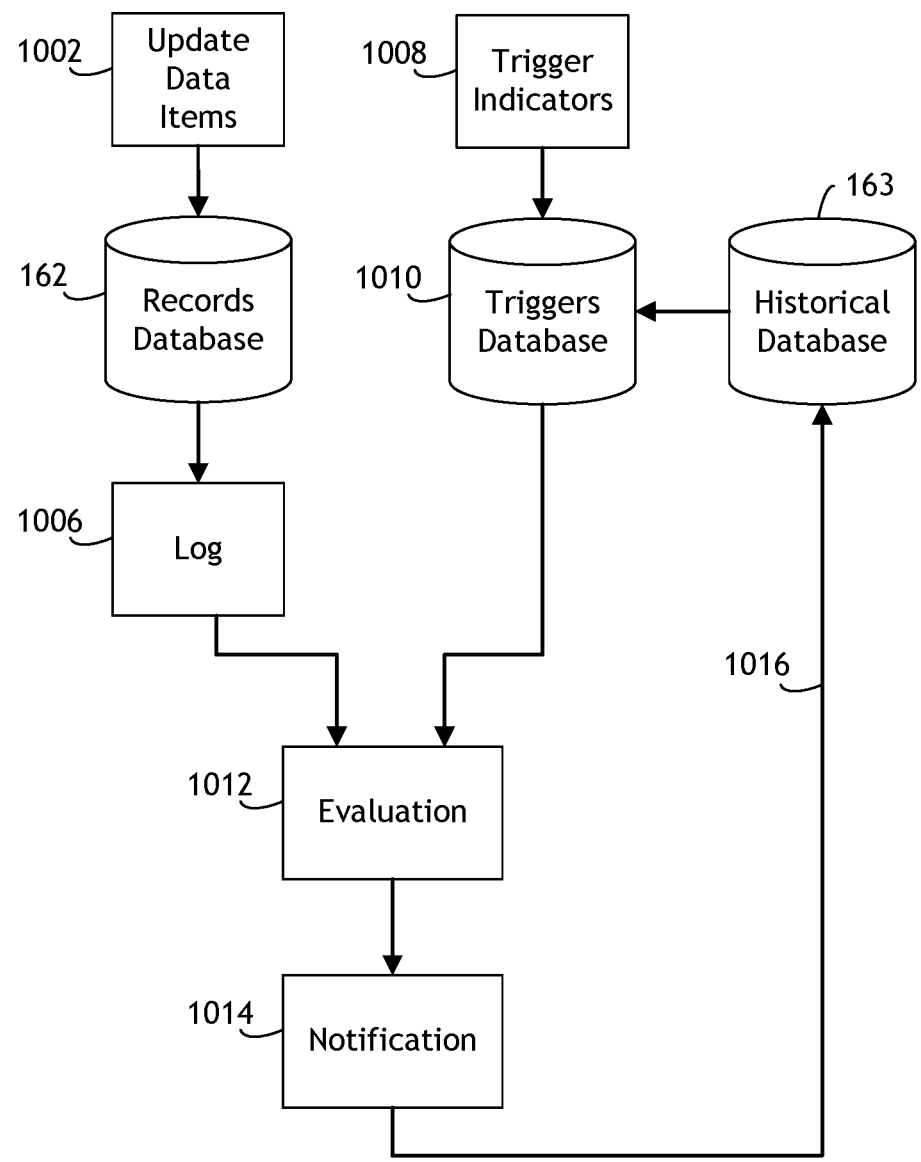
FIG. 1A is a block or data flow diagram of a database system for triggering event notifications based on updates to database records, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, embodiments of the present disclosure relate to a database system (also herein referred to as "the system") for triggering event notifications (also referred to herein as "notifications" or "alerts") based on updates to database records. The system may advantageously provide notifications to interested users of certain types of changes to certain database records. For example, a user may be interested a particular database record, and more specifically to a particular type of change to the particular database record. The system advantageously, upon a change to the particular database record, may determine that the user is interested in changes to the particular database record, and may thus generate a log of the change. Then, the system may then determine that the change that was logged is of the particular type, and may thus generate and send a notification to the user. Further, advantageously, the notification may include information about the change that may be quite useful to the user.

In some implementations, the system may store a history of previous notifications. Thus, for example, the system may advantageously avoid sending out duplicate notifications, and/or may prioritize particular notifications. Further, the system may determine that notifications are to be generated based on historical data.

In some implementations, the system may receive, from various users, indications of triggers that may be implemented by the system. A trigger may be associated with a particular user, such that notifications resulting from that trigger are sent to the user. In some implementations, the notification may cause activation of a device or software application, enabling rapid notification and/or automation activities.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

TERMS

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Database Record and/or Record: One or more related data items stored in a database. The one or more related data items making up a record may be related in the database by a common key value and/or common index value, for example.

Update Data Item and/or Update: Any data item that may be used to update a database record, in whole or in part. For example, an update data item may indicate that it is related to a corresponding database record. The system may compare the update data item to the corresponding database record, determine that the update data item indicates a change to one or more data items of the database record, and then update the database record as indicated by the update data item.

Trigger Indicator and/or Trigger: Any rule that indicates a database record change of interest. A trigger may indicate one or more of: a user associated with the trigger, one or more records of interest (e.g., as indicated by key values and/or index values associated with those one or more records), one or more types of record changes of interest, and/or the like. A trigger may include one or more logical rules.

Event Notification, Notification, and/or Alert: Any notification of a record change of interest. Notifications may include information regarding the record change of interest, and may indicate, e.g., to a user, the occurrence of an event of interest. Notifications may be transmitted electronically, and may cause activation of one or more processes, as described herein.

User: An entity that defines a trigger (e.g., and that is interested in receiving notifications upon the occurrence of record changes indicated by the trigger).

Example Operation of the System

FIG. 1A is a block or data flow diagram of a database system for triggering event notifications based on updates to database records, according to an embodiment. In some implementations, one or more of the blocks of FIG. 1A may be optional, and/or blocks may be rearranged.

At block 1002, the system receives update data items. Such update data items may include, for example, any changes to database records stored by the system in records database 162. Examples of such data items are described below. The system implements these update data items in the records database 162. For example, the system may compare information of the update data item to information of a corresponding database record of the records database 162.

In some instances, the system may determine that information of the corresponding database record is to be updated. For example, the database record may represent a person, and may include the person's name, address, and phone number. Further, the database record may be associated with a unique identifier (e.g., a key value and/or index value). The system may determine that the received update data item is associated with the database record because the update data item includes information that associates the update data item with the database record. For example, the update data item may include the unique identifier, and/or the update data item may include another identifier that may be used to map to the unique identifier by reference to additional information. The system may then determine that the update data item includes a new phone number for the person, and may therefore update the database record with the new phone number information.

In some instance the system may determine that information of the corresponding database record is not to be updated. For example, the update data item may include a phone number, but the system may determine that the phone number is already included in the database record. Accordingly, no update may be necessary.

At block 1006, the system generates a log of each database record update performed by the system. In some implementations, the log includes one or more (or all) items included in the corresponding database record. Further, the log includes an indication of the change or update that was performed in the records database 162.

Database record updates/changes may be continuously logged as the records database 162 is updated. Advantageously, logging updates to the records database 162 speeds up later evaluation of triggers. For example, as described below, triggers may be evaluated against the log of record changes, and may not need to be evaluated against the records database 162 as a whole. This aspect may significantly reduce processing power needed to generate event notifications. Further, because much information related to the updated record may be included in the log, the system may not need to re-query the database to generate notifications, further making the process of generating notification more efficient and less processor intensive. In some implementations, logs of database record updates may be stored in the historical database 163, as described below.

At block 1008, the system receives trigger indicators (e.g., from a user). Such trigger indicators items may include, for example, any rule that indicates a database record change of interest. Examples of such triggers are described below. The system stored these triggers in a triggers database 1010. As an example, a trigger may be associated with a particular record of the records database 162. As with the update data items described above, the trigger may be associated with the particular record by indication of the unique identifier of that record, and/or by any other indication that may be mapped to the record.

The trigger may indicate that only certain changes/updates, or certain types of changes/updates are to cause the system to generate notifications. For example, if the record represents a person (as described above), the trigger may indicate that only changes to the phone number are to trigger notifications.

At block 1012, the system evaluates the log of record changes/updates (from block 1006) and the triggers of the triggers database 1010. For example, in some implementations the system compares each trigger with each logged record change to determine any matches. A match may include, for example, when a particular record identified by a trigger indicates a change of a type indicated by the trigger. In some implementations, both the log of record changes and the triggers of the triggers database 1010 may be indexed by unique identifier (as mentioned above), and one or the other may be queried against the other. In some implementations, the system may determine that certain logged record changes are not associated with any triggers, and discard those certain record changes. In some implementations certain trigger and/or record information may be used to efficiently filter out logged record changes that do not correspond to any triggers. For example, as a preliminary step, the system may filter out any record updates that are not associated with any unique identifiers indicate by the triggers. Then, as a secondary step, the system may evaluate the remaining record changes to see if other criteria of the triggers (e.g., that a type of a change matches a type identified in a corresponding trigger) match such that notifications are to be generated and sent.

Advantageously, as described above, by logging record changes separate from the records database 162, the system may more quickly and efficiently (e.g., by use of less processor time or power) evaluate the triggers and generate notifications. This is because, for example, the entire records database 162 does not need to be evaluated for changes that match triggers.

At block 1014, the system generates and sends notifications for each trigger that is satisfied. The generated notification or alert may comprise a digital and/or electronic message. The notification may include an indication of the corresponding record change, and any other data items from the corresponding record and/or the trigger. The notification may be sent to the user that provided the trigger indicator, and/or to any other recipient indicated by the trigger. Further, the notification may be delivered by any appropriate mode.

In some embodiments, the alert and/or notification is automatically transmitted to a device operated by the user associated with corresponding trigger. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a health data monitoring application or collection management application used by a collection agency), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

In some implementations, the alert and/or notification may be automatically routed directly to an interactive user interface where it may be viewed an evaluated by a user. In another example, the alert and/or notification may be automatically routed directly to a printer device where it may be printed in a report for review by a user. In another example, the alert and/or notification may be automatically routed directly to an electronic work queue device such that information from the notification may automatically be displayed to a user, and optionally information from the notification may be automatically used, e.g., to contact (e.g., dial a phone number) the person represented by the updated record.

In various implementations, record changes may be logged continuously, in real-time or substantially real-time, and/or in batch. In various implementations, triggers and record changes may be evaluated (e.g., as in block 1012) continuously, in real-time or substantially real-time, and/or in batch. In various implementations, notification may be generated and/or sent continuously, in real-time or substantially real-time, and/or in batch.

As indicated by arrow 1016, in some implementations the system may store a history of previous notification in the historical database 163. For example, in some instances a trigger may indicate that no notifications for certain record updates (and/or certain types of updates) are to be provided when such certain record updates are made close in time (e.g., within a "cool off" period) to certain other record updates (and/or notifications). In another example, in some instances trigger may indicate a hierarchy of updates/changes, such that certain record updates (and/or certain types of updates) are to trigger notification in preference to other record updates. In these examples (and others, as described below), the system may advantageously store a history of previous notification in the historical database 163. Examples of such cool offs, hierarchical triggers, and other similar filters that may be implemented in the current system are described in Appendix A of U.S. Provisional Patent Application No. 62/316,399, incorporated by reference herein. Such storage of historical notification information may advantageously also reduce processing power as the system may not need to re-query either the log of record changes or the records database 162 to implement triggers such as those mentioned above (e.g., the rely on some historical notification information).

Additional examples of triggers that may be implemented by the system are also described in Appendix B of U.S. Provisional Patent Application No. 62/316,399, incorporated by reference herein. Therefore any of the examples of triggers described in Appendix A and Appendix B of U.S. Provisional Patent Application No. 62/316,399 may be implemented in combination with one or more implementations/embodiments of the system described herein.

In some implementations, the system advantageously determines whether the update data items originate with, or are associated with, the user who provided a trigger. If so, the system does not generate a notification for that update as, presumably, the user is already aware of the change. In another implementation, the system advantageously provides such notification to the user (e.g., when requested by the user), e.g., as a double check for the user that their data is correctly updated.

In some implementations, the system periodically and/or regularly purges triggers. For example, on a monthly basis, the system may remove any triggers that have not been renewed by the respective user associated with the triggers. In this example, the system may require that users indicate, on a monthly basis, that they are authorized to continue to monitor the relevant records for the particular changes they are triggering one. If such an indication is not received, the system may delete the trigger. Advantageously, such purging of triggers may maintain the efficiency of the system (e.g., in terms of processing power, memory requirements, etc.) by preventing significant buildup of triggers over time, many of which may not be of interest to their respective users any longer.

In various implementations, the records database 162, the historical database 163, the triggers database 1010, and/or any combination of these databases or other databases and/or data storage devices of the system may be combined and/or separated into additional databases.

Additional Example Implementations of the System

Figure 1B:
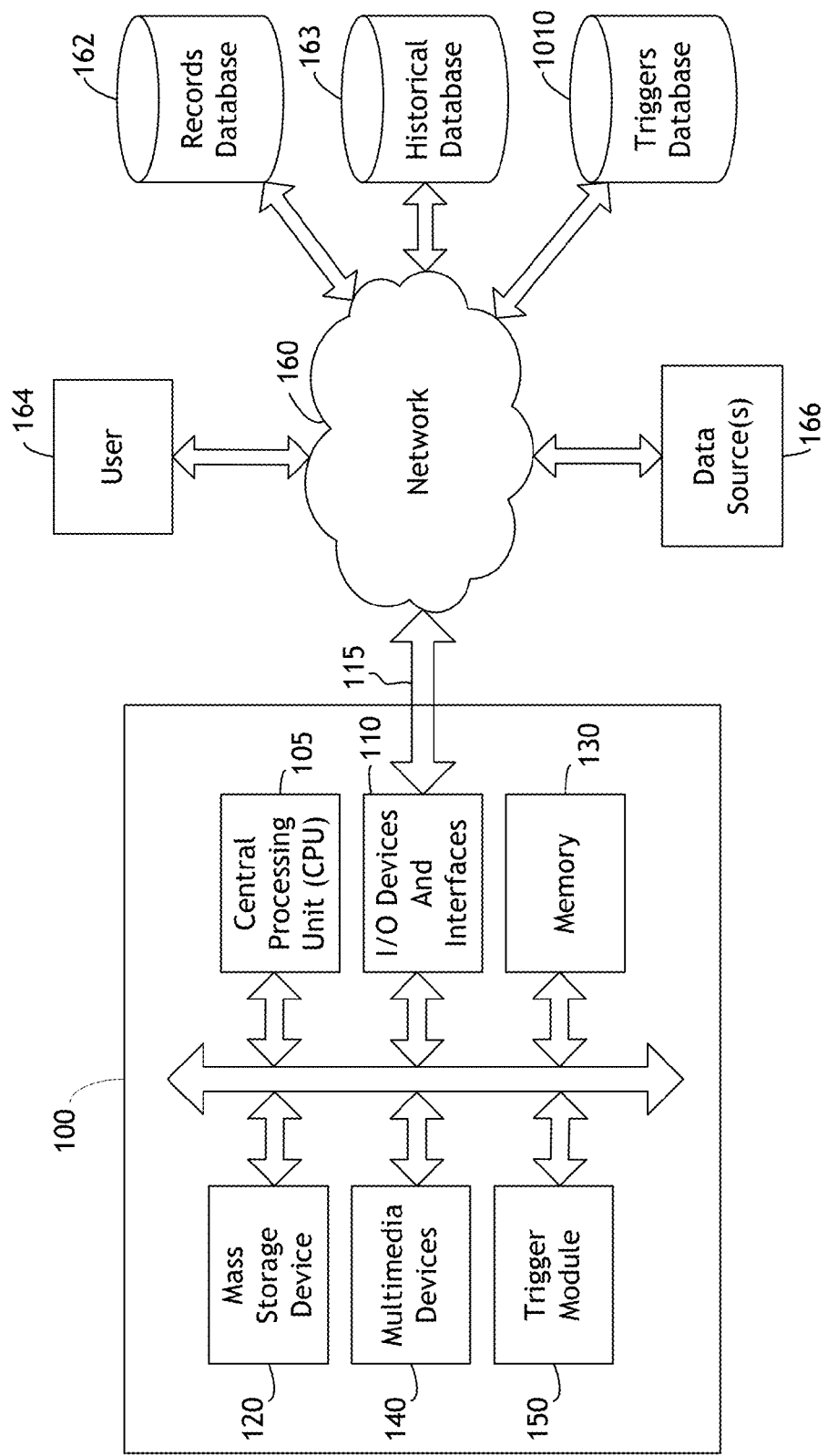
FIG. 1B is another block diagram of the database system, according to an embodiment.

FIG. 1B is one embodiment of a block diagram of a computing system 100 that is in communication with a network 160 and various devices that are also in communication with the network 160. The computing system 100 may be used to implement the database system and various methods described herein. For example, the computing system 100 may be configured to receive various data items and generate reports and/or alerts for one or more users. In some implementations, data items received by the system may include financial and demographic information regarding individuals, consumers, and/or customers (including, e.g., any applicants, or groups of individuals or customers or applicants, such as, for example, married couples or domestic partners, and business entities). In some implementations, users of the system may include financial service providers, such as creditor originators, collection agencies, debt buyers, or any other entities, for example. The functionality provided for by the computing system 100 may be combined into fewer components and/or modules, or further separated into additional components and modules.

The computing system 100 may include, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of graphical user interfaces ("GUIs"), application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1B, the computing system 100 is coupled to a network 160, such as a LAN, WAN, or the Internet, for example, via a wired, wireless, or combination of wired and wireless, communication link 115. The network 160 communicates with various computing devices and/or other electronic devices via wired or wireless communication links. In one embodiment, the computing system 100 is in communication with certain devices, such as records database 162, one or more data sources 166, historical database 163, and triggers database 1010, via a secured local area connection, while the computing system 100 is in communication with a user 164 (e.g., a computing device of the user 164) via any combination of a local area network and the Internet (or other network or communications link). In some implementations, the records database 162 may be referred to as a financial database (e.g., when financial data is stored by the database), and the data sources 166 may include data sources that provide demographic data.

As shown in FIG. 1B, information (e.g., data items) is provided to computing system 100 over the network 160 from one or more data sources including, for example, one or more of the records database 162, the historical database 163, the triggers database 1010, the user 164, and/or the demographic data source 166. The information supplied by the various data sources may include any type of data that may be stored as database records. In some implementations, the information may include credit data, demographic data, application information, product terms, accounts receivable data, and/or financial statements, for example. In addition to the devices that are illustrated in FIG. 1B, the network 160 may communicate with other data sources or other computing devices. In addition, the data sources may include one or more internal and/or external data sources.

Although one user 164 is shown in FIG. 1B, any number of users 164 may communicate with the computing system 100 over the network 160. The user 164 may provide data items related to database records to be monitored (e.g., for triggering notifications). For example, such data items, in some implementations, may include consumer credit activity, such as opening new accounts, making payments on existing accounts, or the like. In addition to supplying data, user 164 may further provide trigger indicators, e.g., the user 164 may request notifications from the computing system 100. For example, the user 164 may request notifications related to particular changes to particular database records of interested to the user. In some instances, the requested notifications may include alerts regarding financial improvement for consumers (e.g., as indicated by record changes in the records database) monitored by the computing system 100. The user 164 may supply a list of trigger indicators, e.g., a list of database records of interest to the user. For example, user 164 may comprises an entity having thousands of customers including several hundred customers with 120 day past due account statuses. The entity may generate a file listing these several hundred customers and transmit the list to the computing system 100 for monitoring for certain records changes related to the customers (e.g., for financial improvements). The file listing the triggers may be in any suitable file format, such as comma separate value (CSV), Extensible Markup Language (XML), or any other file format that is usable by the computing system 100. Trigger indicators may be stored in the triggers database 1010, as described above.

As shown, the computing system of FIG. 1B also includes a trigger module 150 that is configured to access database records (e.g., in the records database 162), compare to trigger indicators (as accessed from the triggers database 1010), and generate notifications (e.g., as generally described above in reference to FIG. 1A). In some implementations, as also mentioned above, database records from the records database 162 may be compared to data items from the historical database 163 to generate notifications. For example, previous notifications may be compared to current database records as part of triggering notifications, as described above. In another example, previous database records (e.g., prior to updating those database records) from the records database 162 may be stored in the historical database 163. For example, current data of consumers may be compare historical data of customers. For example, the trigger module 150 may receive a list of triggers from the user 164 that indicated database records the user to monitor for particular records changes. In response to this request (assuming the proper database record identification information is provided and the user 164 has paid for the monitoring service), the trigger module 150 may periodically access the database records as indicated by the triggers and/or determine when database records have been updated. Further, the trigger module 150 may compare trigger indicators to the updated database records, and/or compare the trigger indicators, database records, and/or historical database records to determine notifications to generate and transmit. In an example, a trigger may be used to identify consumers having an actual or predicted improvement in their ability and/or desire to pay existing and outstanding debt. For example, a trigger may be activated when a consumer has brought an outstanding account from 90+ days past-due status to 30 days past-due status or better by making one or more payments. In some embodiments, trigger criteria (or "trigger indicators" or logical rules of another type) may be provided by different entities that are interested in receiving notifications of activities of related entities. For example, trigger criteria may be based on information indicating that a new account has been established for an entity. In one example, a business, such as a hospital, health care facility, online business, collection agency, etc., may request of the database system notifications when any of a plurality of individuals associated with the entity open a new account, as may be determined by the database system accessing new account information from one or more external databases that the entity does not have access to. Thus, an entity may provide trigger criteria indicating that a notification should be delivered when database records accessed by the database system indicates that any of a plurality of individuals, e.g., individuals having past due balances to the entity or a related entity, have opened a new account, such as an auto lease, mortgage loan, retail loan, auto loan, installment loan, bank/credit card, etc. Additionally, the entity may request notifications when other events associated with individual of interest, such as those individuals having a past due balance of a certain amount and/or for a certain time, such as when new employment information is associated with the individual, new phone update information is identified, and/or new address identified. Accordingly, the entity can obtain notifications of various events and/or combinations of events that may be indicative of a change in the individual's ability to make payments on past due amounts owed to the entity or related entity (e.g., a creditor that has hired a debt collection agency to collect debts of customers, and the debt collection agency subscribes to an improvement trigger service provided by the database system discussed herein).

In one embodiment, the trigger module 150 generates alerts/notifications that are transmitted to the user 164 when a trigger is activated. As described above, the alert may be provided to the user 164 in various formats, such as an email, a file indicating alerts for each of a plurality of database records, a web interface, or any other suitable format. In an example, an alert indicates to the user 164 that a consumer having accounts with outstanding debt, such as an account for which collection efforts have previously been abandoned, may now be a good target for renewed collection efforts.

In an embodiment, the trigger module 150 comprises a rules engine that is configured to receive one or more logical rules (e.g., trigger indicators) as input, execute the logical rules on various data (e.g., database records from the records database 162 and/or the historical database 1010), and generate one or more outputs (e.g., notifications).

Databases and Data Sources

Figure 2:
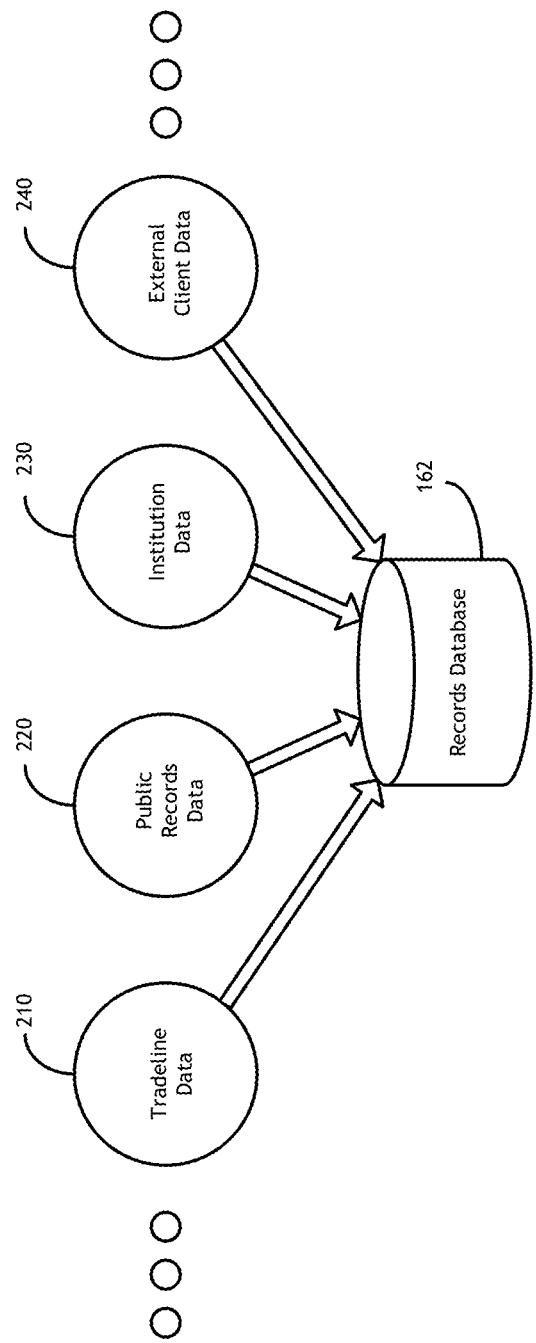
FIG. 2 shows sources of database records, according to an embodiment.

FIG. 2 shows a diagram illustrating that in one embodiment the records database 162 includes data items obtained from various data sources, including but not limited to tradeline data 210, public records data 220, institution data 230 (e.g., credit bureau data), and external user data 240. In one embodiment, the records database comprises consumer credit files that are maintained by a credit bureau. Depending on the embodiment, the records database 162 may comprise multiple databases, or other data structures, that may be operated and/or controlled by different entities. In addition, the data may include externally stored and/or internally stored data. In certain embodiments, tradeline data 210 and public records data 220 is received by the institution database 230. In other embodiments, the records database 162 comprises only a subset of the data available from the various data sources set forth above. The data stored in the records database 162 may be compiled and formatted by the computing system 100. For example, the computing system 100 may receive data items from multiple sources such as the user 164 and the data source(s) 166. In one embodiment, the computing system 100 comprises a local copy, such as in the mass storage device 120 or a storage device that is accessible via a local area network, of at least a portion of the records database 162. This local copy of the records database 162 may be updated periodically, such as daily, weekly monthly, or at any other interval, in order to provide timely database records to the trigger module 150.

In some implementations, the historical database 163 (FIGS. 1A and 1B) stores historical data. According to some embodiments, snapshots of records database 162 at various times are stored in historical database 163. That is, before records database 162 is updated with new database records, for example once each month, the existing data is stored with a timestamp in historical database 163. Historical database 163 may store one or more such snapshots. For example, historical database 163 may store a snapshot of records database 162 for every month, or historical database 163 may store only a previous month's snapshot. As described in more detail below, by comparing historical database records stored in historical database 163 with current database records stored in records database 162, certain triggers may be executed. Depending on the embodiment, historical and records databases 162, 163 may be stored on separate physical storage devices or may be both stored on common storage devices, such as a linked array of servers. In one embodiment, the computing system 100 comprises the historical database 163 or a local copy of at least a portion of the historical database 163 in the mass storage device 120 or a storage device that is accessible via a local area network. As described above, in some implementations, when a database record is updated, a log of the update (as described above in reference to FIG. 1A) is recorded in the historical database 163.

Monitoring Database Activity and Generating Alerts

Figure 3:
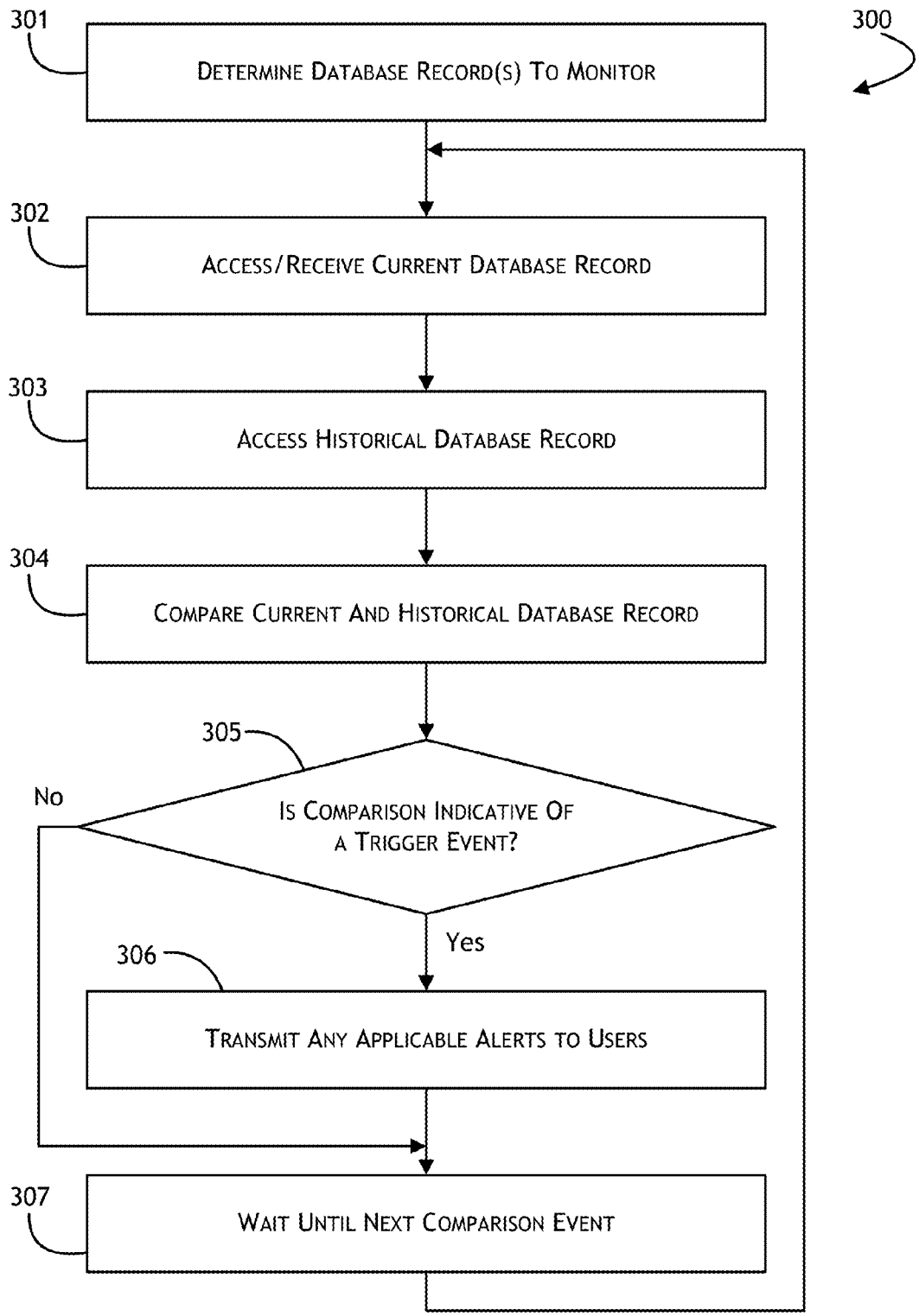
FIG. 3 is a flowchart showing a process for determining whether a trigger has been activated and generating alerts, according to an embodiment.

FIG. 3 shows a process 300 for monitoring database records and generating an alert/notification based on changes or updates in database records, according to an embodiment. The process 300 may be implemented by the trigger module 150 using triggers from the triggers database 1010, and data from the records database 162, the historical database 163, and/or the user 164. Depending on the embodiment, the method of FIG. 3 may include fewer or additional blocks and may be performed in a different order than is illustrated.

The process 300 begins at block 301 where database records are identified to be monitored (e.g., by one or more trigger indicators). Database records to be monitored may be determined, for example, based on a file provided by a user 164 that lists trigger indicators. The user 164 may provide identifying data such as a database record key value (e.g., in some implementations his may include a consumer name, address, and/or social security number in order to identify a consumer). A web page stored on the computing system 100 may be accessed by the user 164 in order to provide trigger information in some embodiments. According to some embodiments, the computing system 100 monitors the records database 162 for which database records are available. In an embodiment where database records are stored as snapshots in the historical database 163, historical snapshots of database records may be available at initiation of a monitoring by the user 164.

Next, at block 302, database records as indicated by the triggers are accessed or received. In one embodiment, the database records are maintained and may be accessed from the records database 162. In some embodiments, database records are obtained from a combination of data sources, such as the records database 162, users 164, data sources 166, and/or one or more other data sources, and the data is maintained and saved by the computing system 100. In some embodiments, new data is obtained in real time when a user request is received, or when a periodic determination of triggers is performed.

An example of a current database record 400 stored in records database 162 is illustrated in FIG. 4A. In one embodiment, the database record 400 comprises data from a credit report and/or other financial data sources. Example current database record 400 contains a number of fields, but alternative or additional fields may be stored in current database record 400 according to some embodiments. In addition, current database records may be stored in any other suitable format, such as in text, spreadsheet, extensible markup, or database files, for example. As shown in FIG. 4A, the current database record 400 comprises first and last name fields 401. In the example shown, the first name has a value of "John" and the last name has a value of "Doe." The current database record 400 further comprises identification information 402 such as an address, social security number and a consumer PIN (e.g., a unique identification number that may be used as a key value for identifying the database record in a trigger).

Current database record 400 further comprises an entry date field 403 identifying the date on which the current database record 400 was stored. In the example shown, the entry date field 403 has a value of "7/31/2007." The current database record 400 may represent the most recent information corresponding to that database record (e.g., the person represented by the database record). As described above, data may be obtained in real time when a user request is made or when indicated by a predetermined schedule according to certain embodiments. Current database record 400 further comprises other information as indicated in FIG. 4A.

Referring again to the process 300 in FIG. 3, the historical database record for the monitored database record is accessed at block 303. The historical database record may be accessed from historical database 163.

FIG. 4B shows a historical database record 410 corresponding to the database record 400. The record 410 corresponds to a snapshot of data for the same database record (e.g., that of "John Doe") indicating information of the database record at a previous point in time. Thus, the name fields 401 and the address, social security number, and customer PIN fields 402 are identical in each of the database record 100 and historical database record 410. However, the entry date for the historical database record 410 is "6/30/2007," which is approximately one month before the 7/31/2007 entry date of the current database record 400. In other embodiments, historical database record 410 may be from a different time period, for example, from 90 days or 180 days ago. Additionally, the historical database 163 may store multiple records for a particular database record, such as monthly snapshots over a period of several years. In some implementations, storing changes in the historical database may be referred to as logging updates to database records.

At block 304, the historical data, such as the historical database record 410, is compared to the current data, such as the current database record 400, such as by the trigger module 150 of the computing system 100 (FIG. 1B). Thus, the trigger module compares current data to at least one snapshot of historical data. The historical record 410 comprises certain information fields that indicate the same information providers as in the current record 400. However, the information has been updated in the current record 400 due to recent activity/updates. Accordingly, as described below, the system may determine that the database record has been updated (and may log information related to the update).

As mentioned above, advantageously, logging updates to the records database 162 (e.g., storing historical data records in historical database 163) speeds up later evaluation of triggers. For example, as described below, triggers may be evaluated against record changes (as indicated by a comparison of current and historical database records), and may not need to be evaluated against the records database 162 as a whole. This aspect may significantly reduce processing power needed to generate event notifications.

Returning to FIG. 3, at decision block 305, the computing system 100 determines if the comparison is indicative of a trigger event. As described above, triggers may comprise a set of logical rules that may be implemented to automatically determine whether a record update of interest exists.

One example trigger may be that whenever any account gets brought from 90 days or more past due to 60 days or less past due, a trigger is activated and a corresponding alert is transmitted to the user. Any number of triggers/rules may be implemented. Different users may use different triggers/ rules. For example, one user may be interested in being alerted upon certain types of database record updates, while another user may only be interested in being alerted when other types of database record updates.

As an example, the system may compare the current record 400 with the historical record 410 (e.g., at block 304), and the trigger module 150 may determine that the database record has been updated. Accordingly, the system may execute one or more triggers. If it is determined that the comparison is indicative of certain types of updates, and one or more triggers were activated, then the process 300 continues to block 306. If the comparison at block 304 is not determined to be indicative of certain types of updates at block 305, then the process 300 skips block 306 and proceeds to block 307.

At block 306, a user 164 that has requested alerts for certain triggers is notified. Notification may come in the form of a report, an e-mail, an automatically generated letter, or any other format that informs the user of the event (as described above). The alert may include specific information related to the database record, may indicate only that a particular trigger has been activated, or may simply indicate the changed record information. After the alert has been generated, the process 300 proceeds to block 307.

At block 307, the system waits until the next comparison event. For example, database records may be compared once every month, whenever the database is updated (e.g., database records are updates), when a user requests information, or at some other time or according to another schedule.

Figure 5:
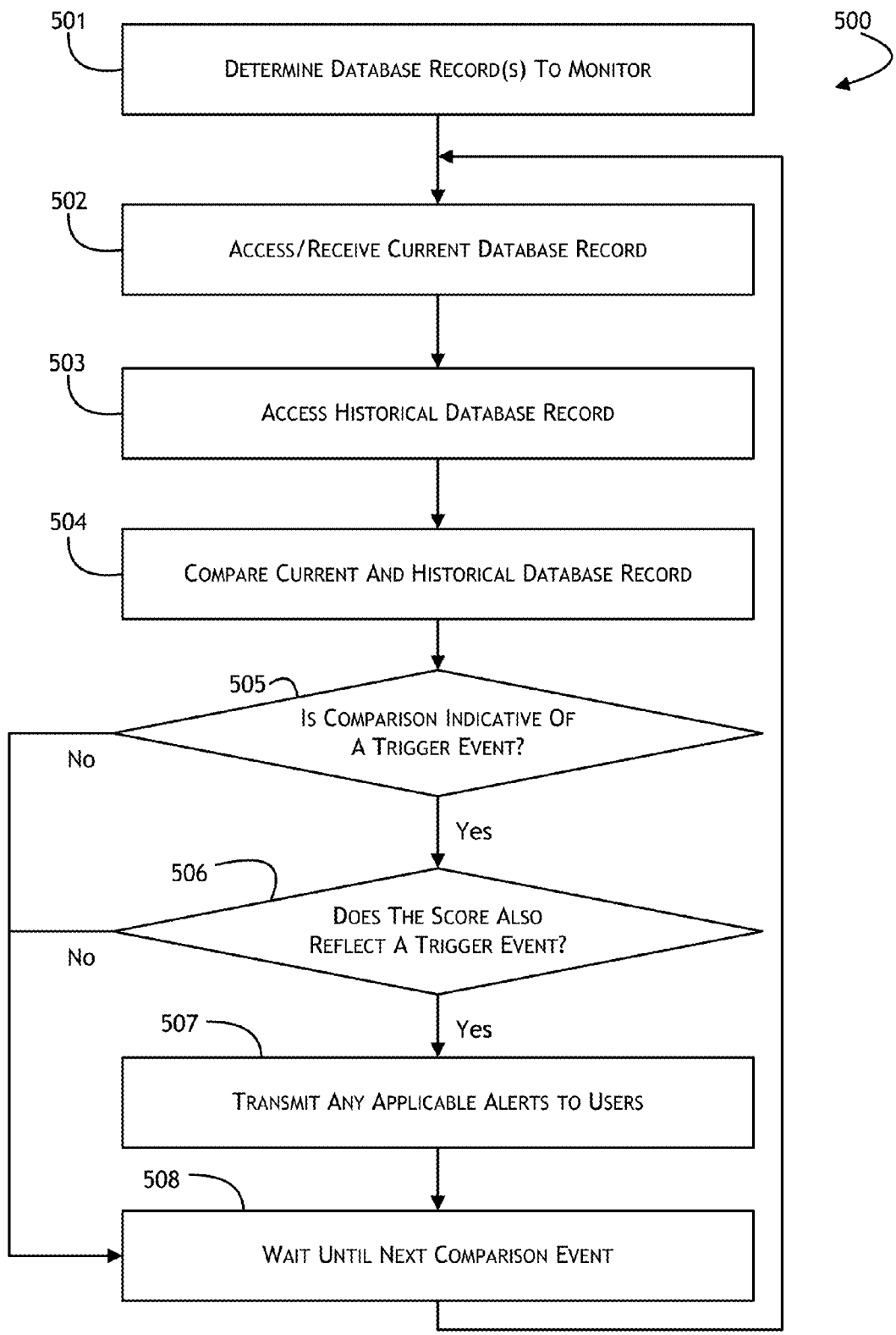
FIG. 5 is a flowchart showing another process for determining whether a trigger has been activated and generating alerts, according to an embodiment.

In an alternate embodiment, the trigger module 150 performs a different process 500 as shown in FIG. 5. Operations performed at blocks 501-505 are similar to those performed at blocks 301-305. In this alternate embodiment, at block 506, the trigger module 150 additionally determines whether a score related to an updated database record matches information provided in a trigger indicator. In one embodiment, a current score (associated with the database record) is compared to a historical score or scores (associated with the database record). If the change in the score is greater than a pre-defined threshold, the trigger may be executed. In another embodiment, a score that meets a pre-defined raw score threshold may execute a trigger. The pre-defined threshold may be one point, two points, five points, ten points, twenty points, fifty points, one hundred points, two hundred points, or any other number of points as indicated by a trigger. In an embodiment the score may be a credit score of a consumer.

In some implementations, a score check may improve the predictive accuracy of the alerts. For example, if 1,000 updated database records meet the trigger criteria at block 505, the score check at block 506 may reduce the number of qualifying records to, for example, 500. The alerts sent to the user at block 507 may include these 500 records. While the number of records is reduced, the user's likelihood to get useful information from these alerts is increased because the alerts are more specifically targeted.

In some embodiments, the database system provides automatic updates to each of a plurality of subscriber entities on a periodic basis, such as on a daily basis. For example, in one embodiment the database system accesses the list of individuals of interest for each of a plurality of subscriber entities nightly, performing one of the processes described above for identifying trigger indicators of interest to the respective subscriber entities. For example, for a first subscriber entity, 10,000 individuals may be provided on a monitoring list for the first subscriber entity. Thus, the database system would access any update data for each of those 10,000 individuals daily and determine if one or more trigger indicators for any of the 10,000 individuals has been triggered. In some embodiments, the database system then generates a report to the subscriber entity providing any updated triggered notifications. For example, with reference to the first subscriber entity noted above, the database system may, on a particular day when the trigger indicators are applied to the 10,000 individuals, determine that 125 of those individuals have updated data associated with them matching the trigger indicators. Thus, in one embodiment those 125 individuals have very recently (e.g., within the previous day) had activity associated with them that is of interest to the subscriber entity (e.g., the individuals may have opened new loans, which indicates to the subscriber entity a change in ability to pay). Accordingly, the database system may generate a "hot list" or "daily contact list", listing the 25 individuals, perhaps along with contact information and information about the updated data item(s) that matched the trigger indicator, and provide that list to the subscriber entity so the subscriber entity can take immediate action. For example, the database system may transmit the list of daily updates to individuals matching trigger indicators each morning so the subscriber entity can contact those individuals, such as seeking payment on past due accounts, as quickly as possible. As noted above, the database system can provide realtime alerts of changes in data items matching trigger indicators, optionally in conjunction with a daily (or weekly, or monthly, etc.) report such as discussed above.

Example Use Case

In an implementation, the database system is used to rapidly notify a creditor ("user") of changes in the database records associated with debtors ("consumers"), e.g., based on certain triggers. The user may be particularly interested in rapid notification because being first to contact a consumer in the event of a change in the consumer's circumstances may greatly increase the chances of collecting on a debt. In this implementation, certain triggering events may be particularly useful in recovering long overdue debt. These may include, for example, a new mortgage loan, a new auto lease, a new retail loan, a new auto loan, an update to employment information, a new installment loan, a new bank card, a new credit card, new phone information, new address information, and/or the like. In this implementation, as also described above, the system may continuously monitor changes to database records and automatically "push" notifications to the user when a triggering event occurs, enabling rapid and timely notification. The combination of these features may enable the user to be the first (e.g., among a number of creditors) to contact a consumer, increasing a likelihood of successfully obtaining payment. Further, various implementations of the system enable a user to focus resources on consumers that are more likely to pay a debt (e.g., those with recent triggering events). The user may advantageously populate notification information into their own system, enabling a person to quickly review the notification and act on the notification. Further, the user may generate, e.g., a daily report of notifications that may then be prioritized by the user for acting on. Yet further, the notifications and associated information may be provided in a format preferred or specified by the user, enabling further efficiencies in acting on the triggering events. Further, the user may monitor a return on investment in the system by evaluating the cost of running the triggers and receiving the notification in relation to the success of obtaining payments for debts, for example. This feedback may also be used to focus in on particular triggers that provide a greater return on investment than others. Such feedback may be automatically performed by the system to iteratively generate notifications that are more and more valuable and more and more timely. In some instances, users have found a return on investment of $72 for each $1 spent on receiving notifications from the database system. Users have also found that use of the database system greatly increases revenue.

Additional Implementation Details and Embodiments

Accordingly, a system is described for monitoring database records over a period of time. When it is determined that a trigger indicator is satisfied, as defined by a user, the user is advantageously alerted to this update.

While the above systems and methods have been described with reference to certain types of database record updates, it will be understood that the invention is not limited to monitoring only these types of updates. Other types of data records may be monitored as described herein, and other rules or triggers may be implemented in order to generate alerts for other types of updates.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer implemented method for generating an alert, the method comprising:
   providing a database system storing database records for a plurality of individual users, wherein each of the database records stored by the database system is associated with a particular user;
   coupling a computing system of a first user with the database system via one or more network communication links;
   receiving, by the database system and from the computing system of the first user, a request to monitor a particular database record associated with a particular individual, wherein the particular database record of the particular individual includes at least a current database record of the particular individual and a historical database record of the particular individual, wherein the request includes:
      an identification of the particular individual usable by the database system to identify the particular database record associated with the particular individual, and
      one or more rules indicating:
         particular types of changes to database records that are of interest to the first user, and
         that the computing system of the first user be notified when the database system determines that one or more of the particular types of change are made to the particular database record of the particular individual identified by the first user;
   accessing, by the database system and from a historical database storing the historical database record of the particular individual identified by the first user, wherein:
      the historical database record was created at a first point in time indicated by a first timestamp of the historical database record, and
      the historical database record includes information indicating any accounts of the particular individual at the first point in time;
   accessing, by the database system and from a current records database storing the current database record of the particular individual identified by the first user, wherein:
      the current database record was created at a second point in time indicated by a second timestamp of the current database record,
      the second point in time is later than the first point in time, and
      the current database record includes information indicating any accounts of the particular individual at the second point in time;
   applying the one or more rules provided by the first user to the current database record of the particular individual and the historical database record of the particular individual to determine whether the particular types of changes have occurred between the first point in time and the second point in time, said applying the one or more rules comprising:
      comparing, by the database system, the historical database record of the particular individual to the current database record of the particular individual to determine whether information indicating accounts of the particular individual has changed between the first point in time and the second point in time;
      if it is determined that information indicating accounts of the particular individual has changed between the first point in time and the second point in time:
         identifying, by the database system, a first type of change or a second type of change to information regarding accounts of the particular individual between the historical database record at the first point in time and the current database record at the second point in time; and
         determining whether the identified first type of change or second type of change matches any of the particular types of changes included in the one or more rules received from the first user; and
      if it is determined that the identified first type of change or second type of change matches any of the particular types of changes:
         automatically generating, by the database system, an electronic alert for communication to the computing system of the first user, wherein the electronic alert indicates the identified first type of change or second type of change between the historical database record of the particular individual and the current database record of the particular individual; and transmitting, by the database system, the electronic alert to the computing system of the first user.

2. The computer implemented method of claim 1, wherein the request from the computing system of the first user further includes at least a name and address associated with the database record.

3. The computer implemented method of claim 1, wherein the first point in time and the second point in time are separated by at least one of: one day, one week, one month, two months, three months, four month, six months, one year, two years, or five years.

4. The computer implemented method of claim 1, further comprising:

accessing, by the database system and from the historical database storing the historical database record of the particular individual identified by the first user, a second historical database record of the particular individual, wherein:

the second historical database record was created at a third point in time indicated by a third timestamp of the second historical database record, the third point in time is earlier than the first point in time, and the second historical database record includes information indicating any accounts of the particular individual at the third point in time; and further applying the one or more rules provided by the first user to the historical database record of the particular individual and the second historical database record of the particular individual to determine whether the particular types of changes have occurred between the first point in time and the third point in time, said applying the one or more rules comprising:

comparing, by the database system, the historical database record of the particular individual to the second historical database record of the particular individual to determine information indicating accounts of the particular individual has changed between the first point in time and the third point in time.

5. The computer implemented method of claim 1 further comprising:

determining, by the database system, a historical score associated with the historical database record of the particular individual, wherein the historical score is associated with the first timestamp;

determining, by the database system, a current score associated with the current database record of the particular individual, wherein the current score is associated with the second timestamp;

determining, by the database system, a score difference between the historical score and the current score; and comparing, by the database system, the score difference to a threshold score difference indicated by the one or more rules, wherein automatically generating and communicating the electronic alert are performed in response to determining both that:

the identified first type of change or second type of change matches any of the particular types of changes, and the score difference satisfies the threshold score difference indicated by the one or more rules.

6. The computer implemented method of claim 5 further comprising:

applying, by the database system, the one or more rules provided by the first user to determine that a specific change to the database record matches a specific change indicated by the one or more rules, wherein automatically generating and communicating the electronic alert are performed in response to determining that:

the identified first type of change or second type of change matches and of the particular types of changes, the score difference satisfies the threshold score difference indicated by the one or more rules, and the specific change matches the specific change indicated by the one or more rules.

\* \* \* \* \*